(12) United States Patent
Burgess et al.

(10) Patent No.: US 9,702,469 B2
(45) Date of Patent: Jul. 11, 2017

(54) LEAK-FREE RISING STEM VALVE WITH BALL SCREW ACTUATOR

(71) Applicant: Big Horn Valve, Inc., Sheridan, WY (US)

(72) Inventors: Kevin Burgess, Sheridan, WY (US); David Yakos, Bozeman, MT (US); Ross Walker, Belgrade, MT (US)

( * ) Notice: Subject to any disclaimer, the term of this patent is extended or adjusted under 35 U.S.C. 154(b) by 13 days.

(21) Appl. No.: 14/938,672

(22) Filed: Nov. 11, 2015

(65) Prior Publication Data

US 2016/0138721 A1    May 19, 2016

Related U.S. Application Data

(60) Provisional application No. 62/080,289, filed on Nov. 15, 2014.

(51) Int. Cl.
| | | |
|---|---|---|
| *F16K 31/08* | (2006.01) | |
| *F16K 3/314* | (2006.01) | |
| *F16K 3/02* | (2006.01) | |
| *F16K 31/12* | (2006.01) | |

(52) U.S. Cl.
CPC .......... *F16K 3/314* (2013.01); *F16K 3/02* (2013.01); *F16K 3/0254* (2013.01); *F16K 31/082* (2013.01); *F16K 31/088* (2013.01); *F16K 31/12* (2013.01)

(58) Field of Classification Search
CPC ...... F16K 31/088; F16K 31/086; F16K 31/12; F16K 31/082; F16K 3/0254; F16K 3/314; F16K 3/02

USPC .......................................................... 251/65
See application file for complete search history.

(56) References Cited

U.S. PATENT DOCUMENTS

| | | | | |
|---|---|---|---|---|
| 2,289,574 | A * | 7/1942 | Carlson | F16K 31/088 251/65 |
| 3,347,262 | A * | 10/1967 | Gibson | F16K 31/088 137/375 |
| 3,355,140 | A * | 11/1967 | Andersen | F16K 1/12 251/129.01 |
| 3,908,959 | A * | 9/1975 | Fichtner | F16J 15/50 251/129.03 |
| 4,284,262 | A | 8/1981 | Ruyak | |
| 4,296,912 | A | 10/1981 | Ruyak | |
| 4,327,892 | A | 5/1982 | Ruyak | |
| 4,382,578 | A | 5/1983 | Ruyak | |
| 4,384,703 | A | 5/1983 | Ruyak et al. | |
| 4,452,423 | A * | 6/1984 | Beblavi | F16K 1/02 251/129.11 |
| 4,671,486 | A | 6/1987 | Giannini | |
| 4,948,091 | A * | 8/1990 | Satoh | F16K 1/12 251/267 |
| 5,039,061 | A | 8/1991 | Heard et al. | |
| 5,129,619 | A | 7/1992 | Castetter | |
| 5,129,620 | A | 7/1992 | Castetter | |
| 5,356,112 | A | 10/1994 | Simar et al. | |

(Continued)

*Primary Examiner* — Umashankar Venkatesan
(74) *Attorney, Agent, or Firm* — Antoinette M. Tease

(57) ABSTRACT

A rising stem valve with a magnetic actuator having an outer and as inner magnet assembly that are magnetically coupled to each other so that the inner and outer magnet assemblies rotate together and a ball screw that is connected to the rising stem valve and that converts rotary to reciprocal motion. The inner magnetic cartridge assembly and valve body comprise a sealed lower section that is completely sealed to the outside environment.

16 Claims, 32 Drawing Sheets

(56) References Cited

U.S. PATENT DOCUMENTS

| | | | |
|---|---|---|---|
| 5,372,351 A | 12/1994 | Oliver | |
| 7,325,780 B2 | 2/2008 | Arai et al. | |
| 8,297,315 B2 | 10/2012 | Esveldt | |
| 8,418,990 B2 * | 4/2013 | Podstawka | B67C 3/2614 |
| | | | 251/229 |
| 8,490,946 B2 | 7/2013 | Burgess et al. | |
| 8,496,228 B2 | 7/2013 | Burgess et al. | |
| 8,690,119 B2 | 4/2014 | Burgess et al. | |
| 9,080,685 B2 * | 7/2015 | Quan | F16K 31/08 |
| 2006/0180780 A1 | 8/2006 | Arai et al. | |
| 2010/0025608 A1 | 2/2010 | Esveldt | |
| 2011/0308619 A1 | 12/2011 | Martino et al. | |
| 2012/0187319 A1 | 7/2012 | Burgess et al. | |
| 2012/0319019 A1 | 12/2012 | Burgess et al. | |
| 2013/0026397 A1 | 1/2013 | Burgess et al. | |
| 2013/0140476 A1 * | 6/2013 | Burgess | F16K 31/088 |
| | | | 251/65 |

* cited by examiner

LEAK-FREE RISING STEM VALVE WITH BALL SCREW ACTUATOR

CROSS-REFERENCE TO RELATED APPLICATION

Pursuant to 35 U.S.C. §119(e), this application claims priority back to U.S. Patent Application No. 62/080,289 filed on Nov. 15, 2014.

BACKGROUND OF THE INVENTION

1. Field of the Invention

The present invention relates generally to the field of valves, and more specifically, to a rising (or reciprocating) stem valve that incorporates a ball screw mechanism and prevents leakage offend to the atmosphere.

2. Description of the Related Art

Attempts have bean made to provide leak-free protection for rising stem valves, which include gate, globe, knife and needle valves. Currently, metal bellows are employed around rising stems in these valves, especially when the valves are handling hazardous fluids. The bellows surround the stems and their associated packings to contain any leaks that penetrate through the packing assembly. Bellows, however, are not inherently leak-free because they eventually tail as metal fatigue begins to form cracks in the bellows. This kind of failure may result in a catastrophic release of hazardous fluid because when the bellows fails, the packing leaks without restraint.

An alternative, inherently leak-free technology is needed to replace bellows in places like chemical plants, refineries, paint factories, and cryogenic applications, where rising stem valves are integral to the functioning of the plant itself. This alternative technology must provide the advantage ox completely containing any leakage of fluids from valves.

A number of patent applications have been filed for valve actuators that mitigate stem leakage through the use of a magnetic interlock. These actuator chambers either enclose the dynamic seal that is present in every valve around the stem of the valves or eliminate the need for the seal entirely. This dynamic seal is known as a packing or mechanical seal. The magnetic interlock is employed to transmit force from the outside to the inside of the actuator chamber, thus avoiding the penetration of the chamber wall by a mechanical stem actuator. Penetration of the chamber wall would nullify the purpose tor the chamber in the first place—to enclose the dynamic seal around the stem and prevent leakage from the seal.

The problem with various proposed magnetic actuators is that the amount of force transmitted by the magnets is not adequate to ensure the proper function of the valve. If an actuator is designed to provide adequate force to open and close the valve, the magnet coupling is so large as to make it impractical. Even with the use of modern rare-earth magnets such as Neodymium Iron Born and Samarium Cobalt, the ability to transmit adequate force to the valve stem is still difficult. The forces provided by the magnets are only a fraction (usually less than 20%) of the force that a mechanical stem actuator can provide. This does not give the valve operator the confidence that his valve can be opened or closed under situations where high force is required, such as high fluid pressure, dry seals, or debris in the fluid path.

Rather than increasing force by building ever larger magnetic couplings, the present invention incorporates a ball screw assembly that multiplies the force supplied by the inner magnetic coupling while at the same time converting that force from rotary to reciprocal motion. For example, a torque of 120 in-lbs. can be converted to an axial force of 2000 lbs. or more by using a typical 0.75" ball screw with a lead of 0.5", the lead being the distance that the screw moves axially with each full rotation of the ball nut. This allows the use of a much smaller magnetic coupling. The reduction in size is desirable because the magnetic coupling is the most expensive component of the actuator.

Through the incorporation of a ball screw subassembly, the present invention provides a magnetically activated valve actuator that can be used in the harshest conditions. Magnetic actuation is no longer appropriate for light applications only. Rather, it is a robust alternative that provides force to the stem that is equivalent to that of low- and medium-pressure dynamically sealed stemmed valves. This innovation is most needed in places like chemical plants, refineries, and pipelines where valves are the central workhorses of the plant or pipeline.

In addition to increasing force and/or decreasing the size of the magnetic coupling, the present invention has the advantage of completely containing any leakage of fluids from the valve bonnet. The present invention is intended to be coupled to valves that are used in hazardous fluid or chemical applications, where stem leakage poses a pollution threat to the outside environment or a safety threat to personnel working nearby. At the very least, leakage from stem packings results in the loss of product, which can be costly. Fugitive emissions account for over 125,000 metric tons of lost product per year in the United States alone. Of this amount, the percentage of fugitive emissions that come from valve stems is estimated to be between 60% and 85%.

The threat posed to the environment by leaking valve stems is great, particularly when the product that is leaked is a fugitive emission, that is, a leaked or spilled product that cannot be collected back from the environment. An example of a fugitive emission would be methane leaking from a valve on a pipeline or in a refinery, in which case the methane immediately goes into the atmosphere and cannot be recaptured. Another example would be crude oil leakage from a valve on an offshore rig, where the oil is earned away by ocean currents and cannot be recovered.

Safety requirements are becoming more stringent with each passing year. Personnel who are required to work near hazardous chemicals—such as operators in a petrochemical plant—are subject to injury from leaking valve stems, especially from reciprocating stems where the hazardous material inside the valve is transported to the outside environment via the stem as it retracts from the valve body. For example, if the valve is handling chlorine, a leaking stern transports it to the outside environment, where it becomes hydrochloric acid when it reacts with moisture in the air. This acid corrodes the stem, which makes it even more difficult to seal over time.

The magnetic actuator of the present invention safely encloses the stem of all reciprocating stemmed valves because it is able to transfer torque through the enclosure magnetically without physically penetrating the enclosure itself. Magnetic actuators have been proposed previously for rotating stem valves. For these devices, the torque is magnified inside of the actuator chamber by the use of a worm gear or a planetary gear set. In the case of rising stem valves, however, the torque must also be converted to reciprocal motion. The present invention proposes the use of a ball screw, which not only magnifies the force of the magnetic actuator, but also converts the rotary motion to reciprocal motion.

Currently, ball screws are being used to actuate high-pressure gate and globe valves where large forces are required to move the valve stem up and down. For example, in a high-pressure, ASME Class #2500 gate valve, the fluid pressure on one side of the gate may be in the range of 5,000 psi, pushing the gate against the downstream valve seat with several tons of force. To lift the gate, the stem must provide as much as 20,000 lbs. or more of lifting force.

Ball screws and helical spline actuators are employed in high-pressure, self-contained hydraulic, electric, or pneumatic actuators, where the actuation force is transferred into the sealed chamber or outer casing by means of electrical wires, hydraulic fittings, or pneumatic fittings. The hundreds or thousands of ft-lbs. of torque required to move these valve stems cannot be transferred magnetically in a practical way; therefore, it has not been obvious that magnetic couplings could ever be coupled to ball screws to actuate rising stem valves. Instead, the automated versions of these valves are self-contained; that is, the mechanical energy required to actuate these valves is provided internally by hydraulic, electric, or pneumatic means.

The present invention cannot be used for the applications described above for the reasons stated; however, it can be used for low- and medium-pressure applications known as ASME class #150, #300, and #600 valves. The ball screw specified in the present invention is much smaller in diameter than those currently being used to actuate high-pressure valves. This accomplishes three things: (1) the lower torque requirement allows the use of magnetic actuation rather than self-contained power (that is, the transfer of torque through the sealed chamber by means of a magnetic coupling is now possible); (2) the smaller diameter ball screw allows for more room for the inner magnetic cartridge, making it possible to consider high-temperature Alnico magnets for use at temperatures up to 950 degrees Fahrenheit; and (3) the mechanical advantage provided by the smaller diameter ball screw (i.e., the ratio of reciprocal force over supplied torque) is much greater than that of the larger high-pressure ball screws when given the same amount of axial travel (or lead) per rotation. (A larger diameter screw has a larger circumference per rotation, which results in a greater axial movement per rotation than with a smaller screw that has the same lead angle. Thus, the smaller screw must have a steeper lead angle in order to supply the same amount of axial travel per rotation as a larger diameter screw. A steeper lead angle increases the efficiency of the screw when converting rotary motion to reciprocal motion.) These advantages are not present in any of the prior art valves that utilize a magnetic actuator.

Examples of valve designs involving magnetic actuators include: U.S. Pat. No. 3,908,959 (Fichtner, 1975); U.S. Pat. No. 4,284,262 (Ruyak, 1981); U.S. Pat. No. 4,296,912 (Ruyak, 1981); U.S. Pat. No. 4,327,892 (Ruyak, 1982); U.S. Pat. No. 4,382,578 (Ruyak, 1983); U.S. Pat. No. 4,384,703 (Ruyak et al., 1983); U.S. Pat. No. 4,671,486 (Giannini, 1987); U.S. Pat. No. 5,039,061 (Heard et al., 1991); U.S. Pat. No. 5,129,619 (Castetter, 1992): U.S. Pat. No. 5,129,620 (Castetter, 1992); U.S. Pat. No. 5,372,351 (Oliver, 1994); U.S. Pat. No. 8,297,315 (Esveldt, 2012); U.S. Pat. No. 8,490,946 (Burgess et al., 2013); U.S. Pat. No. 8,496,228 (Burgess et al., 2013); and U.S. Pat. No. 8,690,119 (Burgess et al., 2014). An example of an attempt to solve the problem of providing a leak-proof valve for cryogenic applications is U.S. Pat. No. 5,356,112 (Simar et al., 1994). An example of a valve that converts rotary motion to linear (reciprocating) motion is U.S. Pat. No. 7,325,780 (Arai et al., 2008). An example of a gate valve that utilizes a motorized ball screw actuator is U.S. Patent Application Pub. No. 2011/0308619 (Martino et al.).

BRIEF SUMMARY OF THE INVENTION

A rising stem valve comprising: a pneumatic actuator assembly comprised of a pneumatic actuator, an upper ball nut, and a ball nut mount, wherein the upper ball nut threads into a bottom end of the ball nut mount, and the ball nut mount threads into a pneumatic piston, the upper bah nut being configured to move up and down with the pneumatic piston; a valve body comprised of a top flange; a gate assembly with a lower ball screw, a gate mount and a gate, wherein a bottom end of the lower ball screw resides within the gate mount, and a lower portion of the gate mount is inserted into a guide channel in the gate; an inner magnetic cartridge assembly comprised of a magnet housing and an inner magnetic cartridge, wherein the inner magnetic cartridge is comprised of an inner magnet carrier around which a plurality of inner magnets are arranged radially and spaced apart from one another, and wherein the inner magnetic cartridge resides within the magnet housing; an outer magnetic assembly comprised of an outer magnet carrier and an outer magnet top that is fixedly secured to the outer magnet carrier, a plurality of outer magnets held within the outer magnet carrier, the outer magnets being magnetically coupled to the inner magnets so that when the outer magnets rotate, the inner magnets rotate in a same direction; and an upper ball screw with a top end that threads into the upper ball nut so that the upper ball screw rotates as the ball nut moves linearly up and down, and a bottom part that is coupled to the outer magnet top so that the outer magnet top rotates with the upper ball screw; wherein the gate assembly is contained within the valve body, and the inner magnetic cartridge assembly and valve body comprise a sealed lower section that is completely sealed to an outside environment; wherein the outer magnetic assembly is secured to the sealed lower section; wherein the magnet housing is fixedly attached to the top flange of the valve body; wherein an inner ball nut is locked rotationally to the inner magnet carrier; and wherein the inner ball nut is configured to cause the lower ball screw to move linearly up and down within the valve body as the inner ball nut rotates.

In a preferred embodiment, the inner magnets are situated within channels in the inner magnet carrier. Preferably, the inner magnetic cartridge assembly further comprises a spacer that abuts up against a bottom surface of the inner magnet carrier, and a spring ring that is situated on an upper surface of the spacer between the spacer and the inner magnet carrier. A first upper tapered roller bearing is preferably situated inside of the magnet housing directly underneath a ceiling of the magnet housing. A first lower tapered roller bearing is preferably situated inside of the magnet housing between the spacer and a compression nut.

In a preferred embodiment, the spacer is configured to rotate along with the inner ball nut and the inner magnet carrier. Preferably, the outer magnetic assembly further comprises a second upper tapered roller bearing and a second lower tapered roller bearing, the second upper tapered roller bearing being situated inside a bottom end of the outer magnet top and the second lower tapered roller bearing being held in a recess on an inside of the outer magnet carrier. The second upper tapered roller bearing preferably comprises an outer raceway that is constrained by the outer magnet top and an inner raceway that is constrained by the magnet housing, and the second lower tapered roller bearing preferably comprises an outer raceway that is constrained by the magnet housing and an inner raceway that is constrained by the magnet housing.

In an alternate embodiment, the present invention is a rising stem valve comprising: a manual actuator assembly comprised of a handle assembly and a manual actuator mount assembly; a valve body comprised of a top flange; a gate assembly with a lower ball screw, a gate mount and a gate, wherein a bottom end of the lower ball screw resides within the gate mount, and a lower portion of the gate mount is inserted into a guide channel in the gate; an inner magnetic cartridge assembly comprised of a magnet housing and an inner magnetic cartridge, wherein the inner magnetic cartridge is comprised of an inner magnet carrier around which a plurality of inner magnets are arranged radially and spaced apart from one another, and wherein the inner magnetic cartridge resides within the magnet housing; and an outer magnetic assembly comprised of an outer magnet carrier and an outer magnet top that is fixedly secured to the outer magnet carrier, a plurality of outer magnets held within the outer magnet carrier, the outer magnets being magnetically coupled to the inner magnets so that when the outer magnets rotate, the inner magnets rotate in a same direction; wherein the outer magnet top is configured to rotate as the handle assembly rotates; wherein the gate assembly is contained within the valve body, and the inner magnetic cartridge assembly and valve body comprise a sealed lower section that is completely sealed to an outside environment; wherein the outer magnetic assembly is secured to the sealed lower section; wherein the magnet housing is fixedly attached to the top flange of the valve body; wherein an inner ball nut is locked rotationally to the inner magnet carrier; and wherein the inner ball nut is configured to cause the lower ball screw to move linearly up and down within the valve body as the inner ball nut rotates.

In a preferred embodiment, the inner magnets are situated within channels in the inner magnet carrier. Preferably, the inner magnetic cartridge assembly further comprises a spacer that abuts up against a bottom surface of the inner magnet carrier, and a spring ring that is situated on an upper surface of the spacer between the spacer and the inner magnet carrier. A first upper tapered roller bearing is preferably situated inside of the magnet housing directly underneath a ceiling of the magnet housing. A first lower tapered roller bearing is preferably situated inside of the magnet housing between the spacer and a compression nut.

In a preferred embodiment, the spacer is configured to rotate along with the inner ball nut and the inner magnet carrier. Preferably, the outer magnetic assembly further comprises a second upper tapered roller bearing and a second lower tapered roller bearing, the second upper tapered roller bearing being situated inside a bottom end of the outer magnet top and the second lower tapered roller bearing being held in a recess on an inside of the outer magnet carrier. The second upper tapered roller bearing preferably comprises an outer raceway that is constrained by the outer magnet top and an inner raceway that is constrained by the magnet housing, and the second lower tapered roller bearing preferably comprises an outer raceway that is constrained by the outer magnet carrier and an inner raceway that is constrained by the magnet housing.

In one embodiment, the handle assembly comprises a handle and a key, and the key fits into a first keyway in a center hole of the handle and a second keyway in the outer magnet top.

REFERENCE NUMBERS

Figure 1:
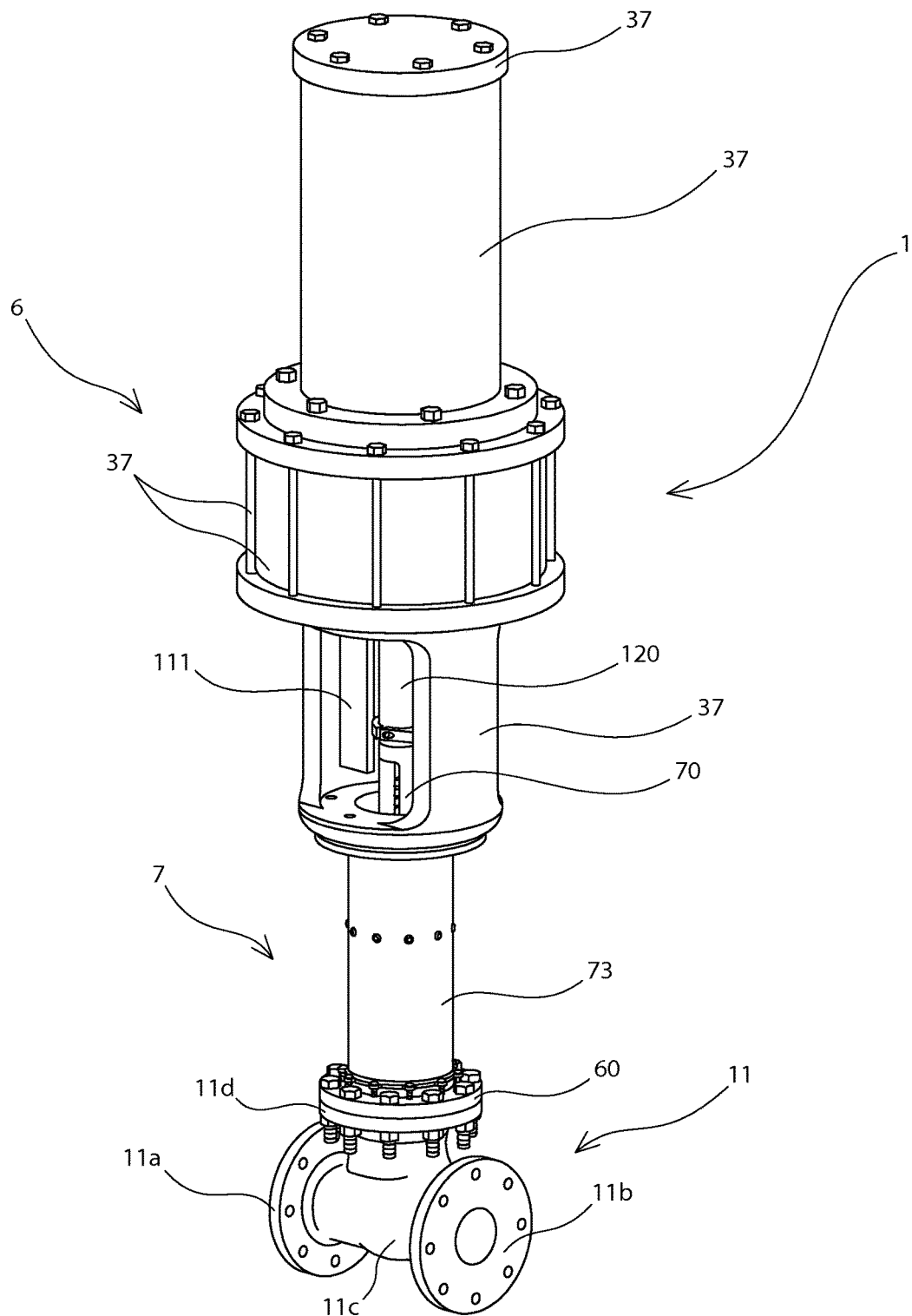
FIG. 1 is a perspective view of the present invention fully assembled with a pneumatic actuator.

6 Pneumatic actuator assembly
7 Pneumatic actuator mount assembly

8 Outer magnetic assembly (pneumatic actuator)
9 Inner magnetic cartridge assembly
10 Gate assembly
11 Valve body
11a Left flange (of valve body)
11b Right flange (of valve body)
11c Central portion (of valve body)
11d Top flange (of valve body)
12 Inner magnetic cartridge
13 Manual actuator mount assembly
14 Handle assembly
15 Outer magnetic assembly (manual actuator)
20 Upper tapered roller bearing
22 Inner ball nut
23 Spring ring
24 Lower tapered roller bearing
25 Lower ball screw
26 Gate mount
27 Lock pin
28 Gate
29 Upper ball screw
30 Set screw
33 Spring washer
34 Upper tapered roller bearing
35 Snap ring
36 Lower tapered roller bearing
37 Pneumatic actuator
38 Upper ball nut
39 Handle
40 Snap ring
41 Key
42 Washer
43 Retaining bolts
44 Bolt
45 Cylinder bead bolt
46 Set screw
47 Set screw
60 Magnet housing
61 Inner magnets
62 Inner magnet carrier
63 Spacer
64 Compression nut
65 Compression jam nut
66 Outer magnet top
67 Retaining cap
68 Outer magnet carrier
69 Outer magnets
70 Ball nut mount
71 Mount can top (pneumatic actuator)
72 Mount can divider
73 Mount can (pneumatic actuator)
74 Retaining ring
75 Mount can top (manual actuator)
76 Alternate embodiment of mount can (manual actuator)
101 Relief gap
104 Valve gate guide channel
105 Valve gate guide
108 Sealed lower section
111 Pneumatic shaft guide
112 Clamp-on guide
117 Shoulder (of mount can)
118 Key way
120 Pneumatic piston
150 Channel (in inner magnet carrier)
151 Bolts
152 Nuts
153 Channel (in outer magnet carrier)
155 Guide rollers
157 Bolt holes
158 Flange gasket
160 Keyway
161 Set screw hole
163 Bolt holes
164 Groove

DETAILED DESCRIPTION OF INVENTION

FIG. 1 is a perspective view of the present invention fully assembled with a pneumatic actuator. This figure shows the major parts of the invention, namely, the pneumatic actuator 37, pneumatic actuator assembly 6, pneumatic piston 120, ball nut mount 70, pneumatic actuator mount assembly 7, mount can 73, magnet housing 60, and valve body 11. As shown in the figures, the magnet housing 60 serves as a barrier between the inner and outer magnets 61, 69 of the magnetic actuator (see, in particular, FIG. 19). All of these parts are described more fully below.

Figure 2:
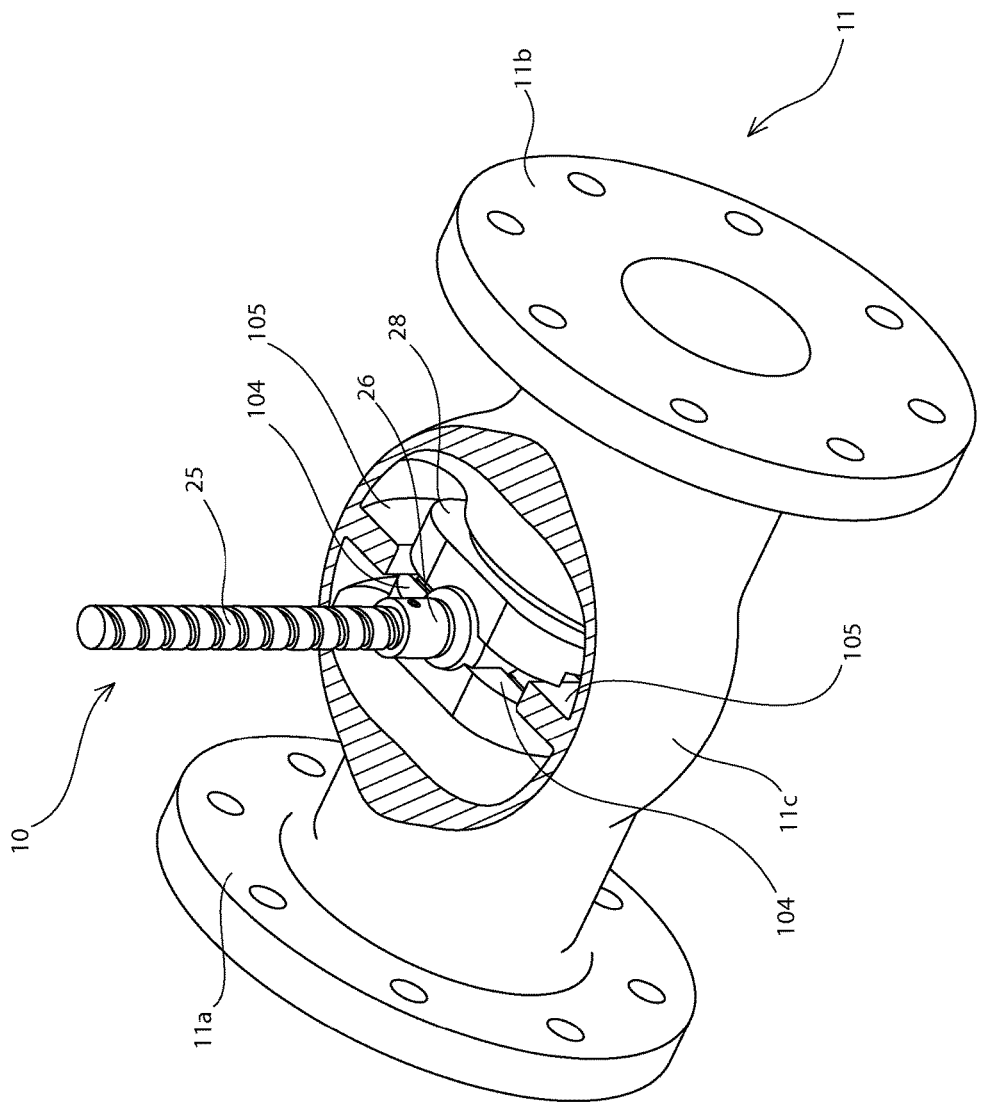
FIG. 2 is a perspective view of the valve body and gate assembly.

FIG. 2 is a perspective view of the valve body and gate assembly. As shown in this figure, the gate assembly 10 is situated within the valve body 11. The valve body 11 is comprised of a left and right flange 11a, 11b and a central portion 11c situated between the two flanges. The gate assembly 10 is comprised of a lower ball screw 25, a gate mount 26, and a gate 28 (as well as set screw 27 shown in FIG. 4). The gate assembly 10 is further comprised of a valve gate guide channel 104 and a valve gate guide 105. In a preferred embodiment, the ball screw 25 is Part No. S5-016100L-305/280-D(3)B-Y/N manufactured and distributed by Heli-Tek of Muskego, Wis. The ball screw 25 is preferably comprised of grade 5 stainless steel and is seven inches long with a diameter of 16 mm and a 10 mm lead, left helix; the helix is preferably ground as opposed to rolled. In a preferred embodiment, the upper ball screw 29 is the same part as the lower ball screw 25 except with respect to length; the upper hail screw 29 is preferably 8.25 inches long. In alternate embodiments, the lead of the upper ball screw 29 may be different than the lead of the lower ball screw 25 in accordance with the requisite torque load.

Figure 12:
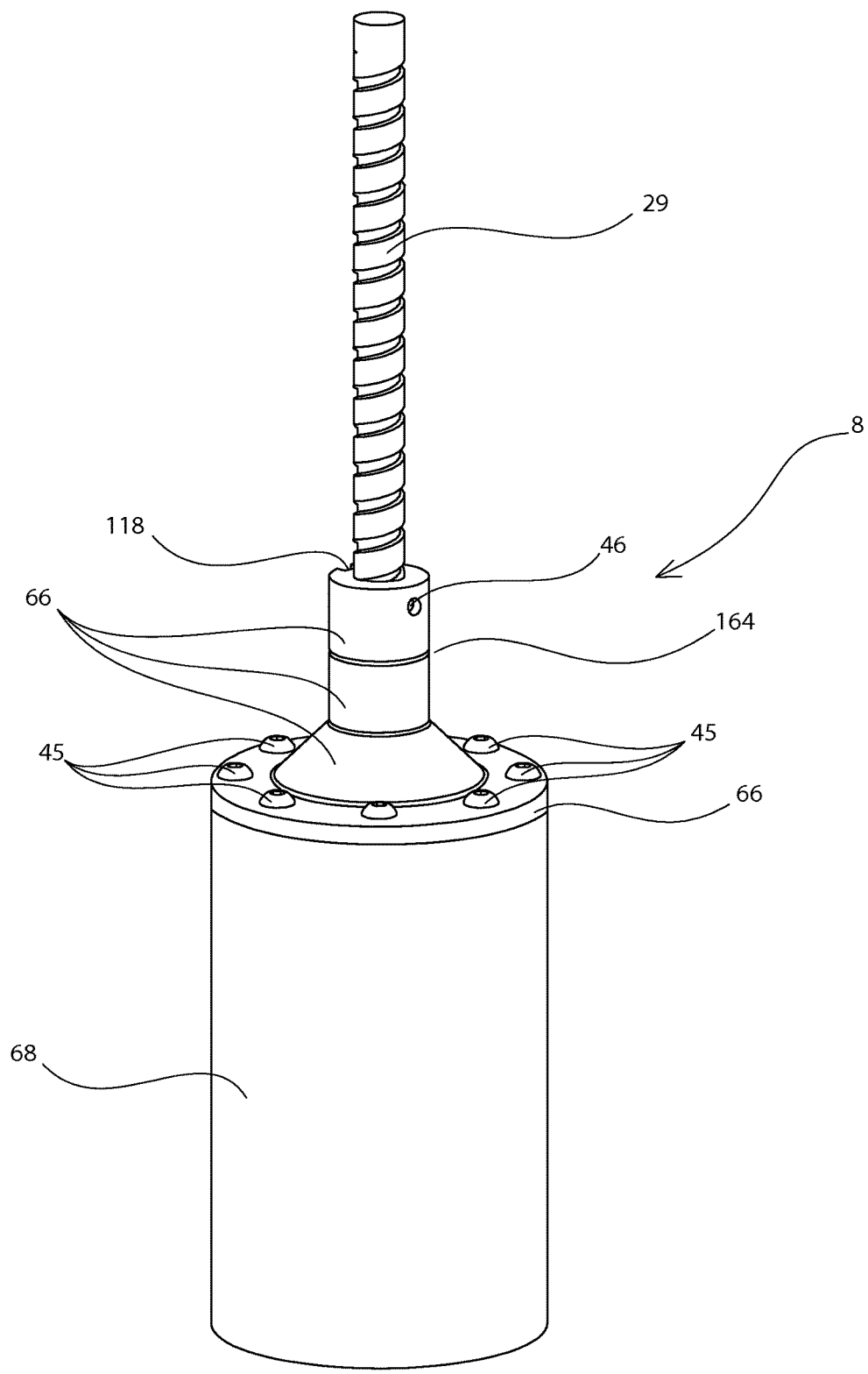
FIG. 12 is a perspective view of the outer magnetic assembly.

This high lead angle screw is also used in the pneumatic piston actuator shown in FIG. 12. In this application, the same high lead angle ball screw is used to convert linear motion in rotary motion in order to power the driver magnet cartridge. Because the exact same ball screw is preferably used prior to the magnetic coupling as well as after the magnetic coupling, the axial motion produced by the pneumatic cylinder is replicated exactly by the motion supplied to the gate valve. This makes it easy for a technician to calibrate the proper stroke for a given gate valve, knowing that the stroke supplied from the pneumatic cylinder is identical in length to the stroke inside of the valve.

Figure 3:
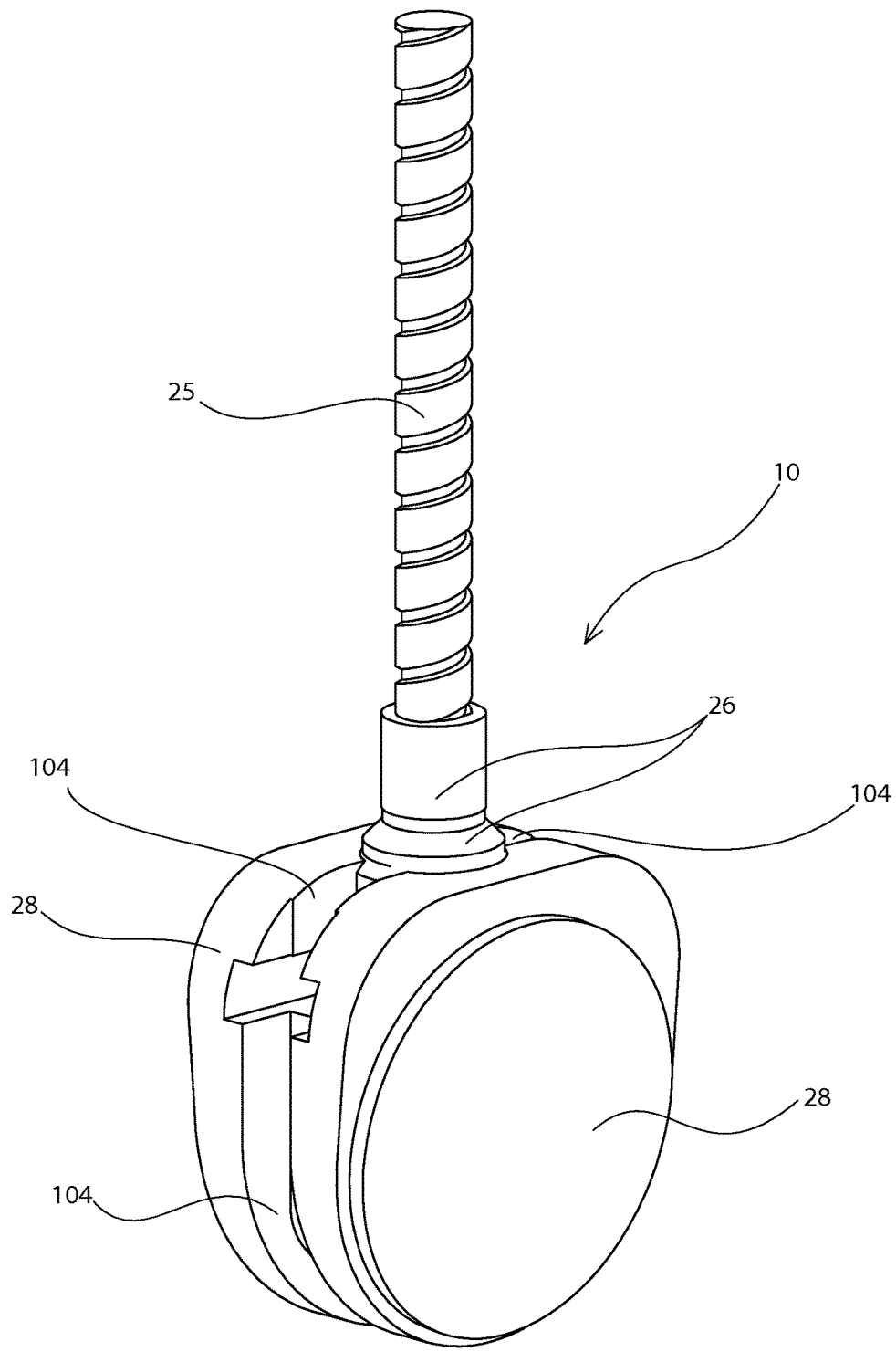
FIG. 3 is a perspective view of the lower ball screw and gate assembly.

FIG. 3 is a perspective view of the lower ball screw and gate assembly. The gate assembly 10 comprises the lower ball screw 25, the bottom end of which resides within the gate mount 26. The lower portion of the gate mount 26 is inserted into a guide channel 104 in the gate 28.

Figure 4:
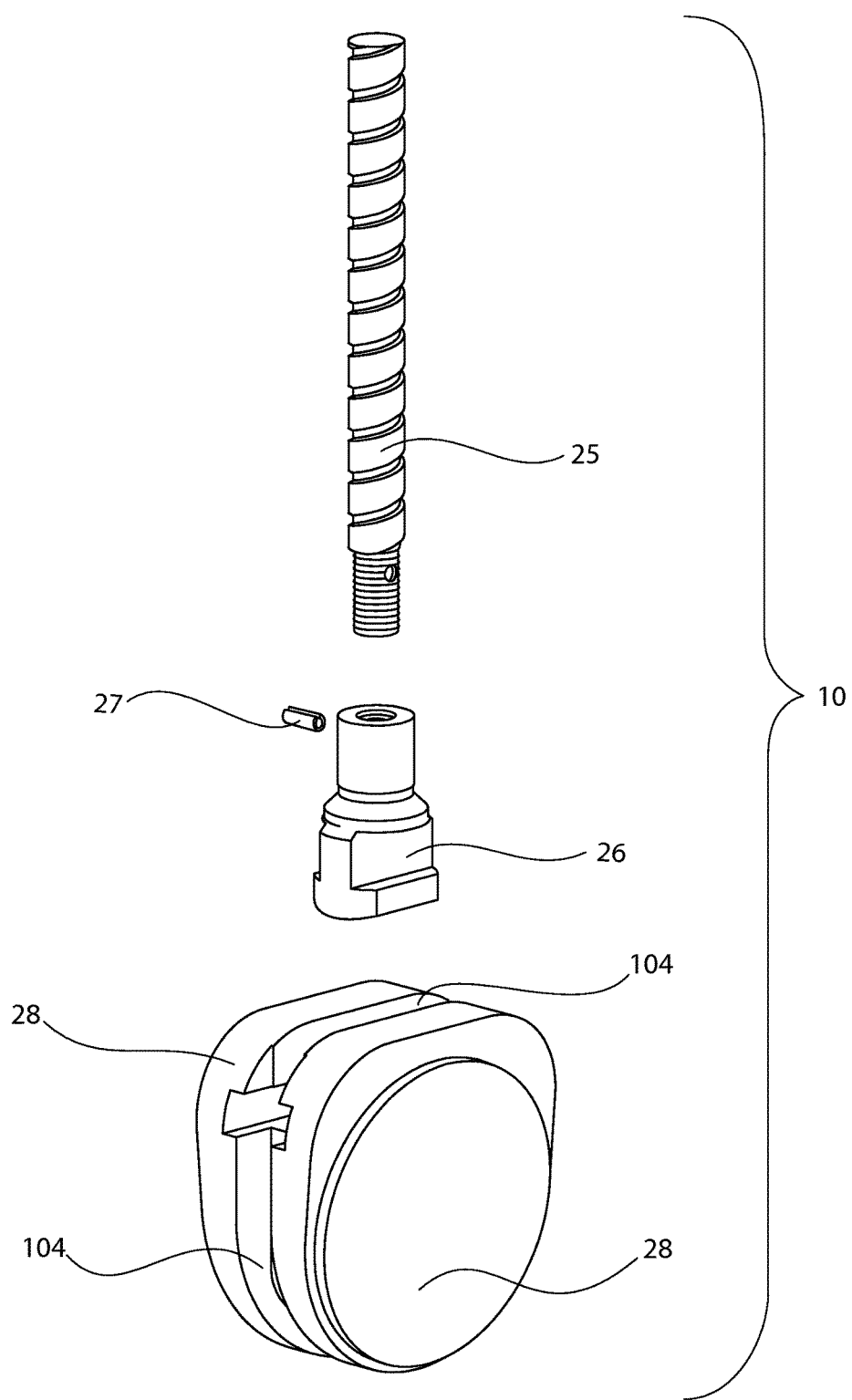
FIG. 4 is an exploded view of the lower ball screw and gate assembly.

FIG. 4 is an exploded view of the lower ball screw and gate assembly. As shown in this figure, a lock pin 27 secures the bottom end of the lower ball screw 25 in the gate mount 26. The bottom portion of the gate mount 26 slides into the recess shown in the guide channel 104 at the front of the gate 28.

Figure 5:
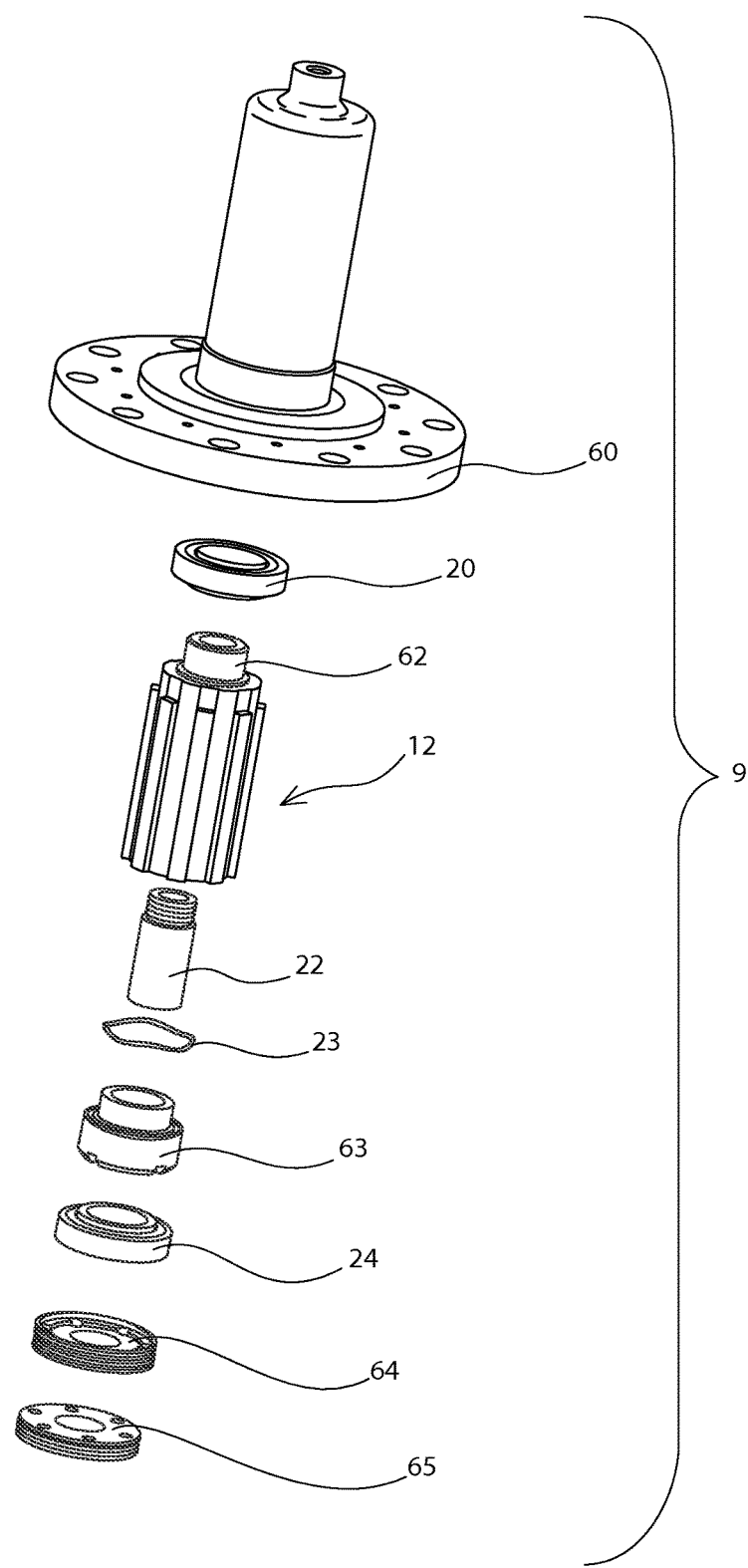
FIG. 5 is an exploded view of the inner magnetic cartridge assembly.

FIG. 5 is an exploded view of the inner magnetic cartridge assembly. As shown in this figure, the inner magnetic cartridge assembly 9 is comprised of a magnet housing 60, an upper tapered roller bearing 20, and the inner magnetic cartridge 12. It is further comprised of an inner ball nut 22, spring ring 23, spacer 63, lower tapered roller bearing 24, compression nut 64 and compression jam nut 65. These pieces fit together, as shown, to form the inner magnetic cartridge assembly 9.

Figure 6:
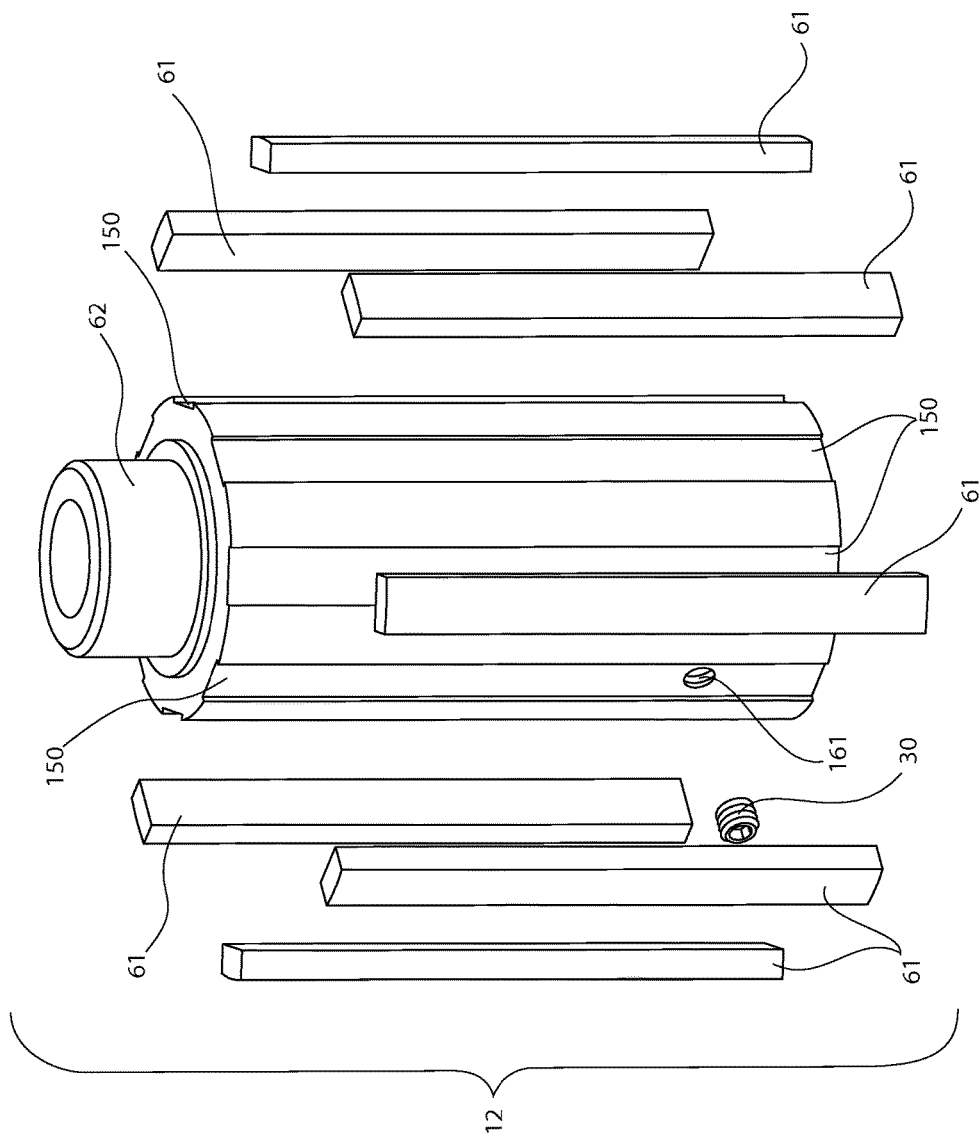
FIG. 6 is an exploded view of the inner magnetic cartridge.

FIG. 6 is an exploded view of the inner magnetic cartridge. The inner magnetic cartridge 12 is comprised of an inner magnet carrier 62 around which the inner magnets 61 are arranged radially and spaced apart from one another so that no two magnets 61 are in contact with one another. The inner magnets 61 are situated within inner magnet channels 150 in the inner magnet carrier 62. The inner magnet carrier 62 preferably comprises a set screw hole 161 into which a set screw 30 is inserted. This set screw 30 ensures that the ball nut 22 (see FIG. 10) does not rotate.

Figure 7:
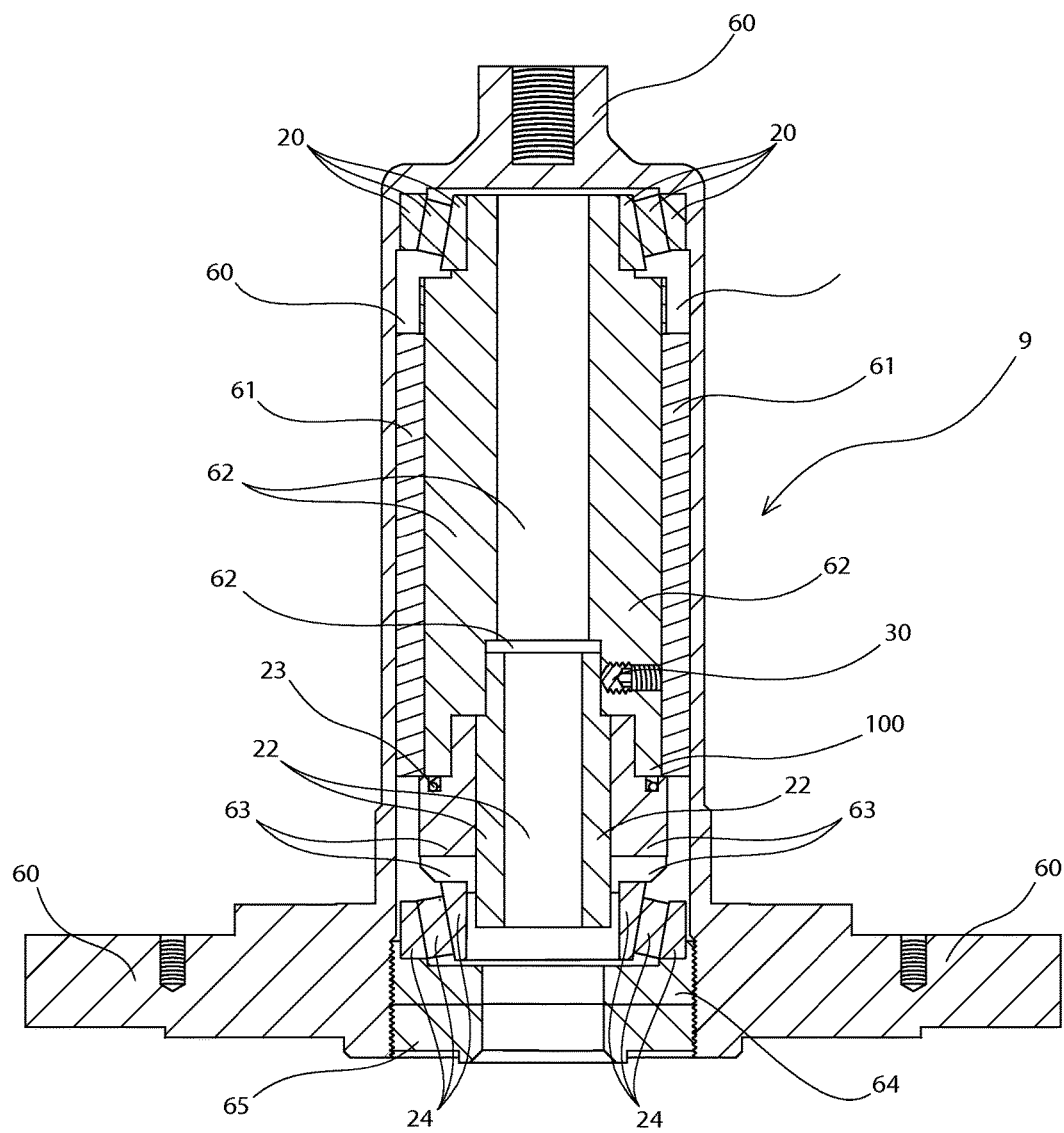
FIG. 7 is a section view of the inner magnetic cartridge assembly.

FIG. 7 is a section view of the inner magnetic cartridge assembly. This figure shows the magnet housing 60, as well as the spacer 63, compression nut 64 and compression jam nut 65. The spacer 63 allows access to the ball nut 22, and it also provides a mounting surface for the spring ring 23. The spacer 63 also serves to lower the surface upon which the lower tapered roller bearing 24 is acting. The compression nut 64 enables tightening of all of the parts contained within the magnet housing 60, and the compression jam nut 65 ensures that the compression nut 64 does not slip. A spring ring 23 is situated on an upper surface of the spacer 63, as shown, between the spacer 63 and the inner magnet carrier 62. A lower tapered roller bearing 24 is situated inside of the magnet housing 60 between the compression nut 64 and the spacer 63; the lower tapered roller bearing holds the spacer 63, inner ball nut 22 and inner magnet carrier 62 concentrically within the magnet housing 60. An upper tapered roller bearing 20 is situated inside of the magnet housing 60 directly underneath the ceiling of the magnet housing 60; its purpose is to provide a counterforce to the lower tapered roller bearing 24 and maintain the spacer 63, inner ball nut 22 and inner magnet carrier 62 concentric within the magnet housing 60. As the gate 28 and ball screw 25 move upward, force is exerted on the upper tapered roller bearing 20. Similarly, as the gate 28 and ball screw 25 move downward, force is exerted on the lower tapered roller bearing 24. The upper and lower tapered roller bearings 20, 24 work together to maintain the concentricity of the parts located within the magnet housing 60. Note that the angle of the upper tapered roller bearing 20 is opposite that of the lower tapered roller bearing 24.

Figure 8:
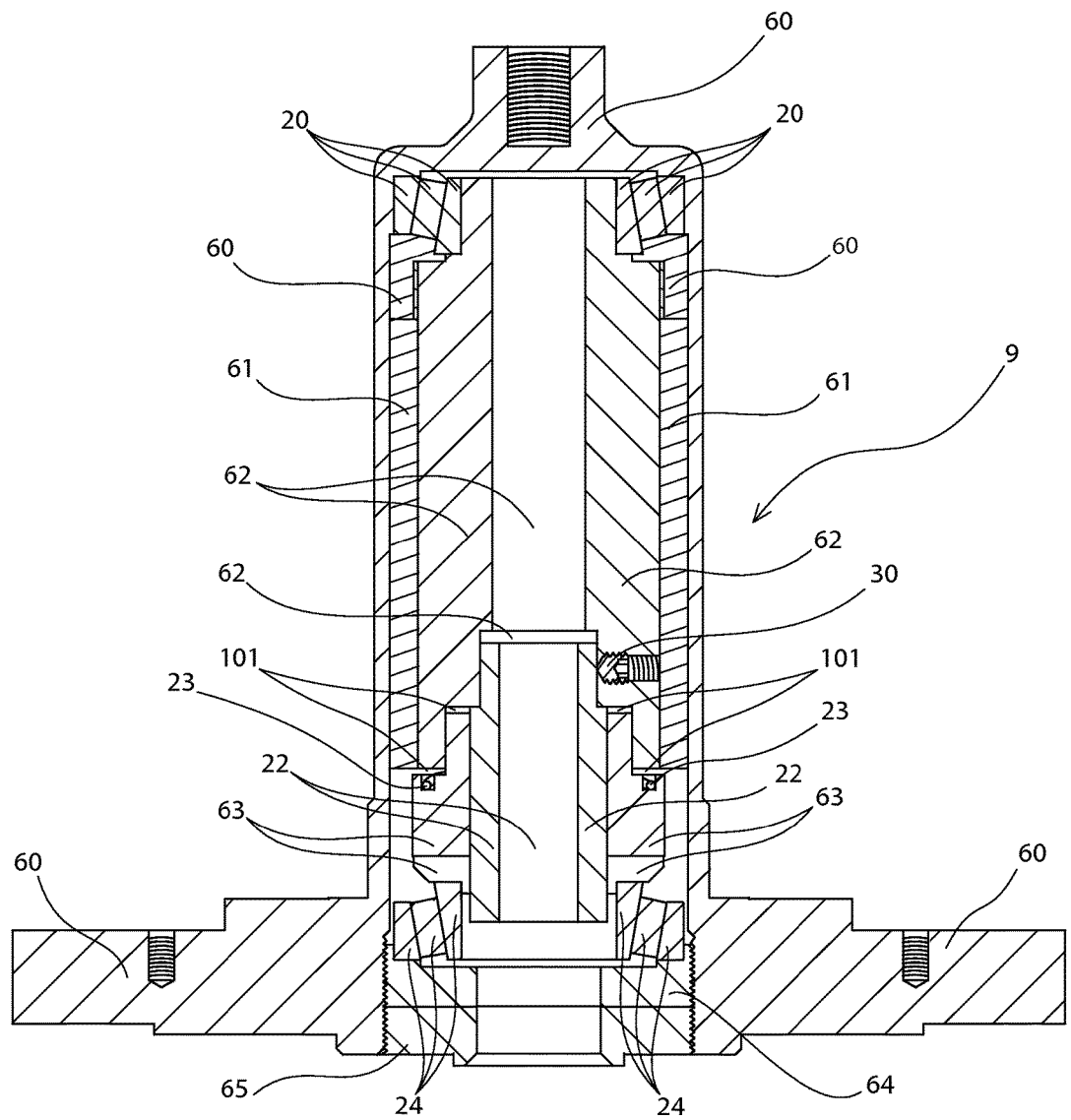
FIG. 8 is a section view of the inner magnetic cartridge assembly with relief gap.

FIG. 8 is a section view of the inner magnetic cartridge assembly with relief gap. In FIG. 7, the spring ring 23 is compressed; in FIG. 8, on the other hand, the spring ring 23 has been uncompressed, which creates a gap 101 between a bottom surface of the inner magnet carrier 62 and the spacer 63, as shown. (Note that the degree of tightening of the compression nut 64 determines the magnitude of this gap 101.) The purpose of this gap 101 is to allow for thermal expansion of the spacer 63, inner ball nut 22 and inner magnet carrier 62 in certain high-temperature applications.

Figure 9:
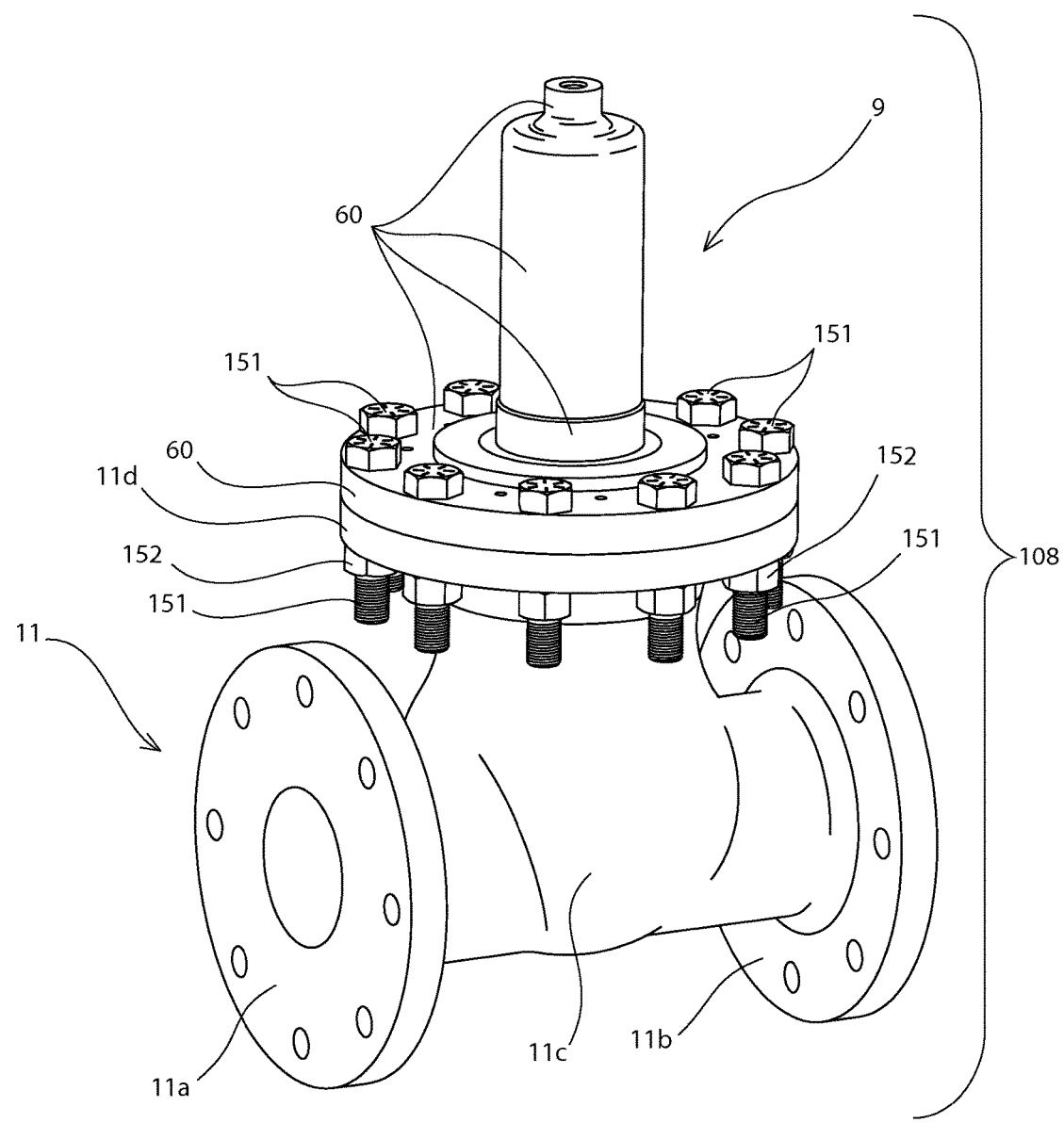
FIG. 9 is a perspective view of the sealed lower section with valve body and inner magnetic cartridge assembly.

FIG. 9 is a perspective view of the sealed lower section with valve body and inner magnetic cartridge assembly. This figure shows the magnet housing 60 and the bolts 151 and nuts 152 that secure the magnet housing 60 to the flange 11d on top of the valve body 11. Note that the sealed lower section 108 is completely sealed to the outside environment.

Figure 10:
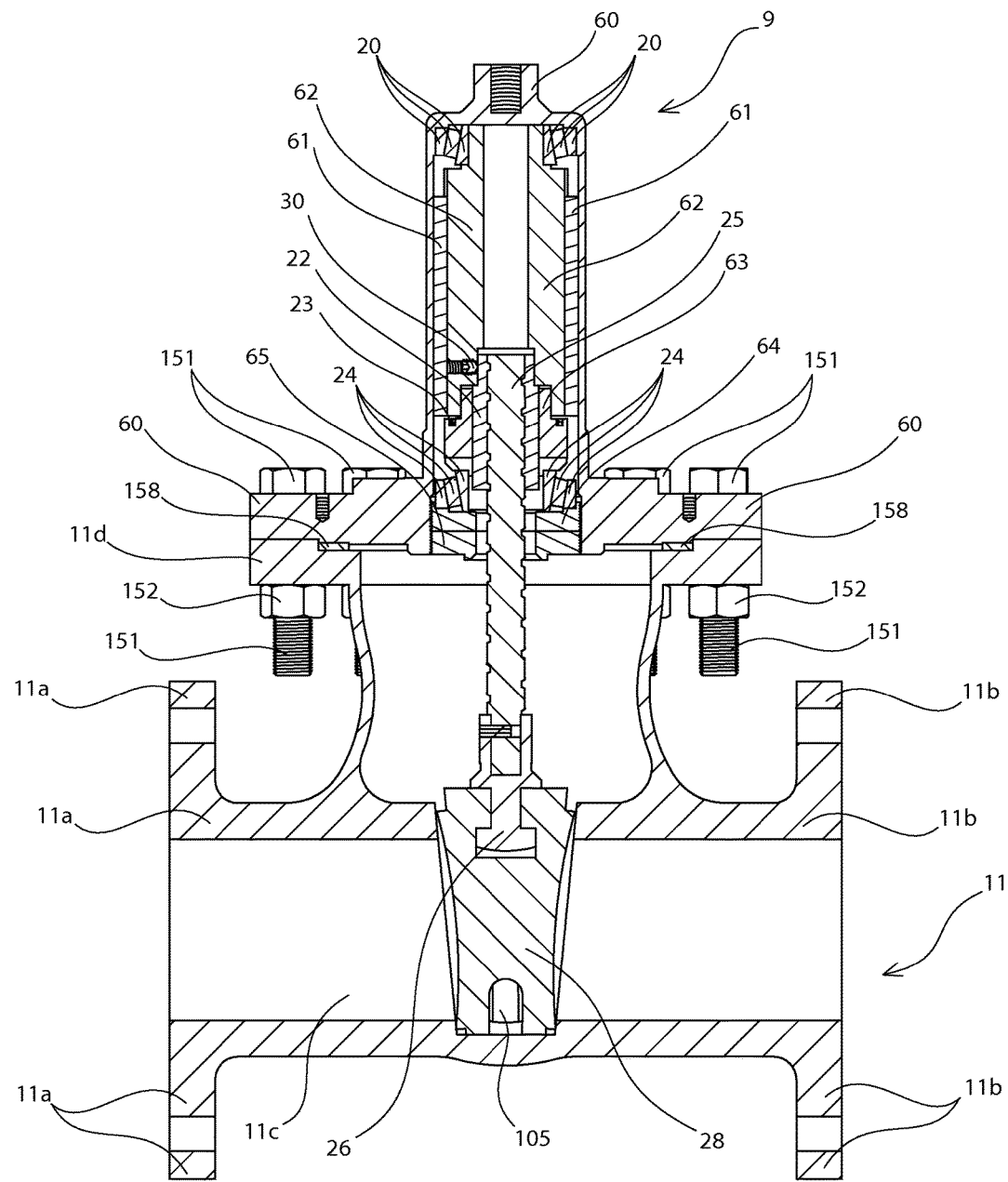
FIG. 10 is a section view of the sealed lower section with valve body and inner magnetic cartridge assembly shown with the valve closed.

FIG. 10 is a section view of the sealed lower section with valve body and inner magnetic cartridge assembly shown with the valve closed. The inner magnet carrier 62 and inner magnets 61 reside inside of the magnet housing 60. The outer magnets 69 are not shown in this figure, but as they rotate, the magnetic coupling between the outer and inner magnets 69, 61 causes the inner magnets 61 (and, therefore, the inner magnet carrier 62) to rotate in the same direction as the outer magnets 69. The inner magnet carrier 62 is fixedly attached to the inner ball nut 22 so that the inner ball nut 22 also rotates with the outer magnets 69. The ball nut 22 is locked rotationally to the inner magnet carrier 62 via the set screw 30. The inner ball nut 22 converts the rotary motion of the inner magnet carrier 62 to a reciprocating motion. As the inner ball nut 22 rotates, it causes the ball screw 25 to move linearly up and down within the valve body 11 and magnet housing 60. The gate 28, gate mount 26 and ball screw 25 (in other words, all parts shown in FIG. 3) move together (up and down) as a single unit.

Figure 31:
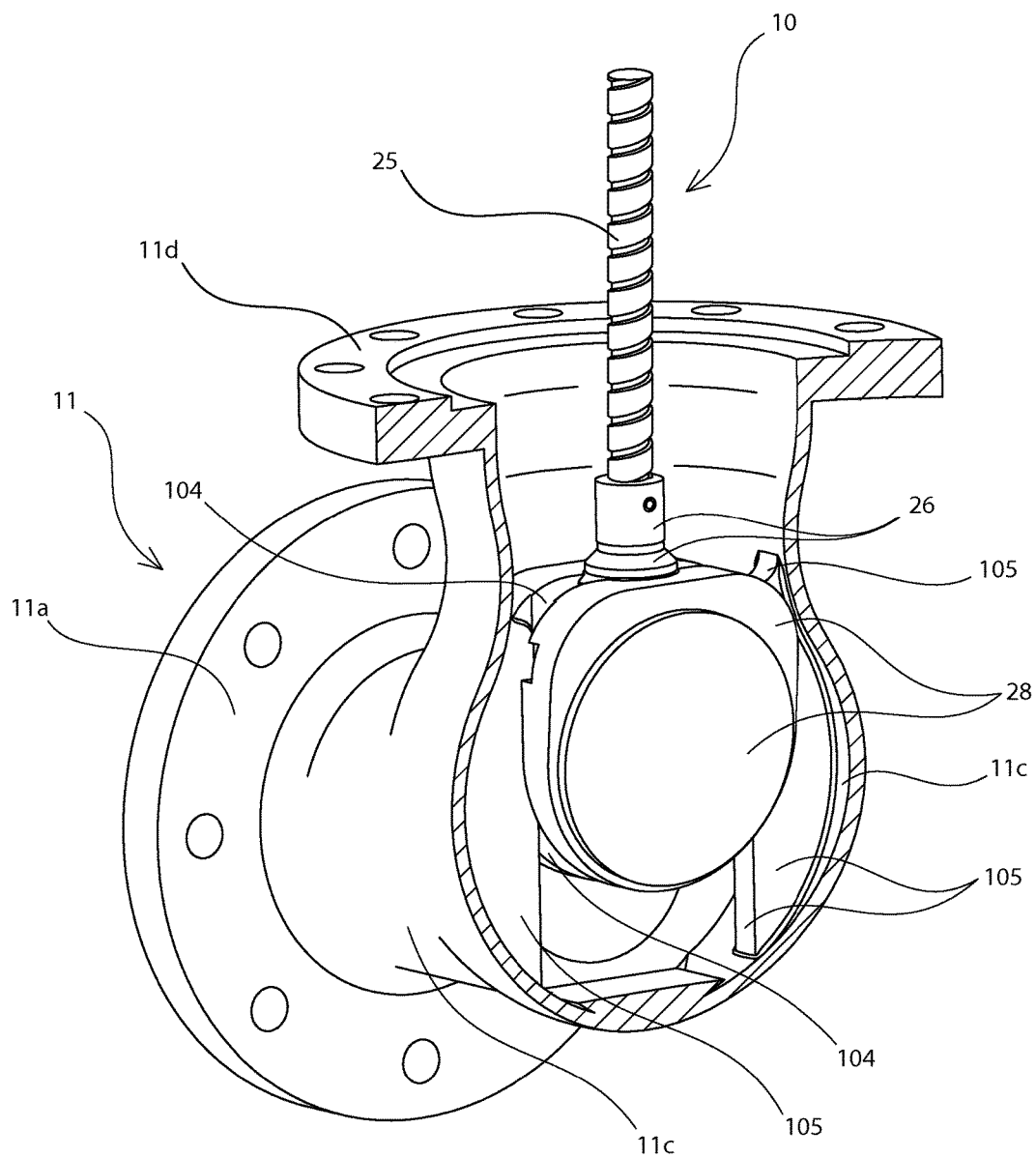
FIG. 31 is a section view of the valve body showing the interaction between the valve gate guide channel and valve gate guide.

When the inner ball nut 22 and inner magnet carrier 62 rotate, the spacer 63 also rotates. The spacer 63 comprises a neck that slips into the bottom of the inner magnet carrier 62 (see FIG. 8). The compression nut 64 puts pressure on both the inner magnet carrier 62 and the spacer 63, which forces them to rotate together. The ball screw 25 moves up or down, depending on the direction of rotation of the inner magnet carrier 62. The flange gasket 158, which is situated between the bottom flange of the magnet housing 60 and the upper flange 11c of the valve body, prevents fluid from escaping between the magnet housing 60 and the valve body 11. The valve gate guide 105 that was shown in FIG. 1 is also shown in this figure. The valve gate guide 105 prevents the gate 28 from rotating, thereby ensuring that the gate 28 moves only up or down within the valve body 11. The valve gate guide channel 104 in the gale 28 (see also FIG. 2) receives the valve gate guide 105, which extends inward in two parts on opposite sides of the central portion 11c of the valve body. FIG. 31 shows in greater detail the relationship between the valve gate guide channel 104 and the valve gate guide 105.

Figure 11:
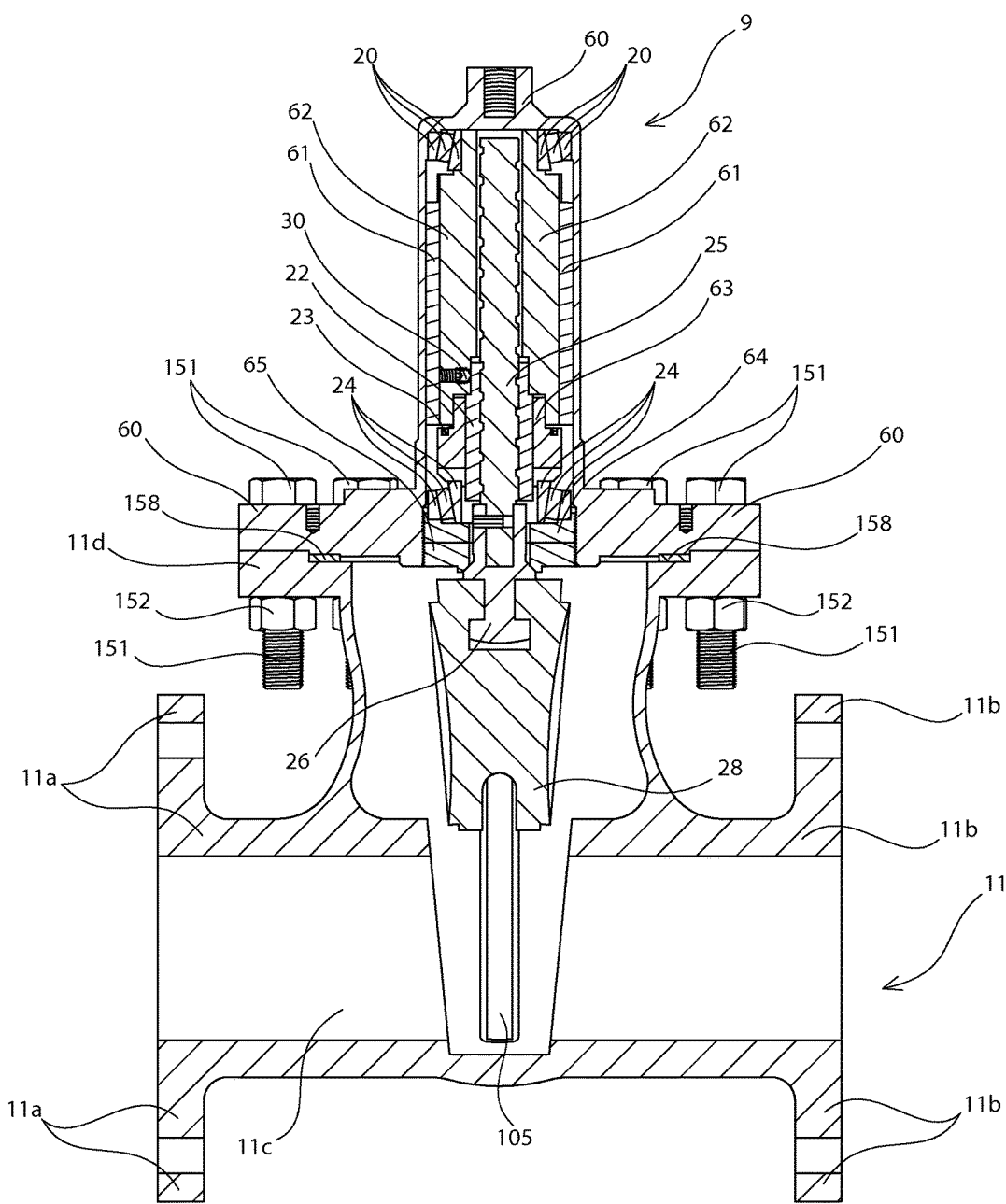
FIG. 11 is a section view of the sealed lower section with valve body and inner magnetic cartridge assembly shown with the valve open.

FIG. 11 is a section view of the sealed lower section with valve body and inner magnetic cartridge assembly shown with the valve open. The same parts are shown as in FIG. 10, except that the lower ball screw 25 has been moved upward by virtue of the rotation of the inner ball nut 22, thereby causing the gate 28 to move upward as well.

FIG. 12 is a perspective view of the outer magnetic assembly. As shown in this figure, the outer magnet top 66 (more specifically, the bottom flange of the outer magnet top) is secured to the top of a cylindrical outer magnet carrier 68 with cylinder head bolts 45. As shown in greater detail in FIG. 13, the outer magnet top 66 is comprised of a cylindrical top part, a bottom flange with a protruding base, and a skirt section that joins the cylindrical top part to the bottom flange. The bottom part of the upper ball screw 29 is inserted into a central threaded hole in the outer magnet top 66 and secured with a set screw 46. This set screw 46 ensures that the upper ball screw 29 does not rotate independently of the outer magnet top 66.

Figure 13:
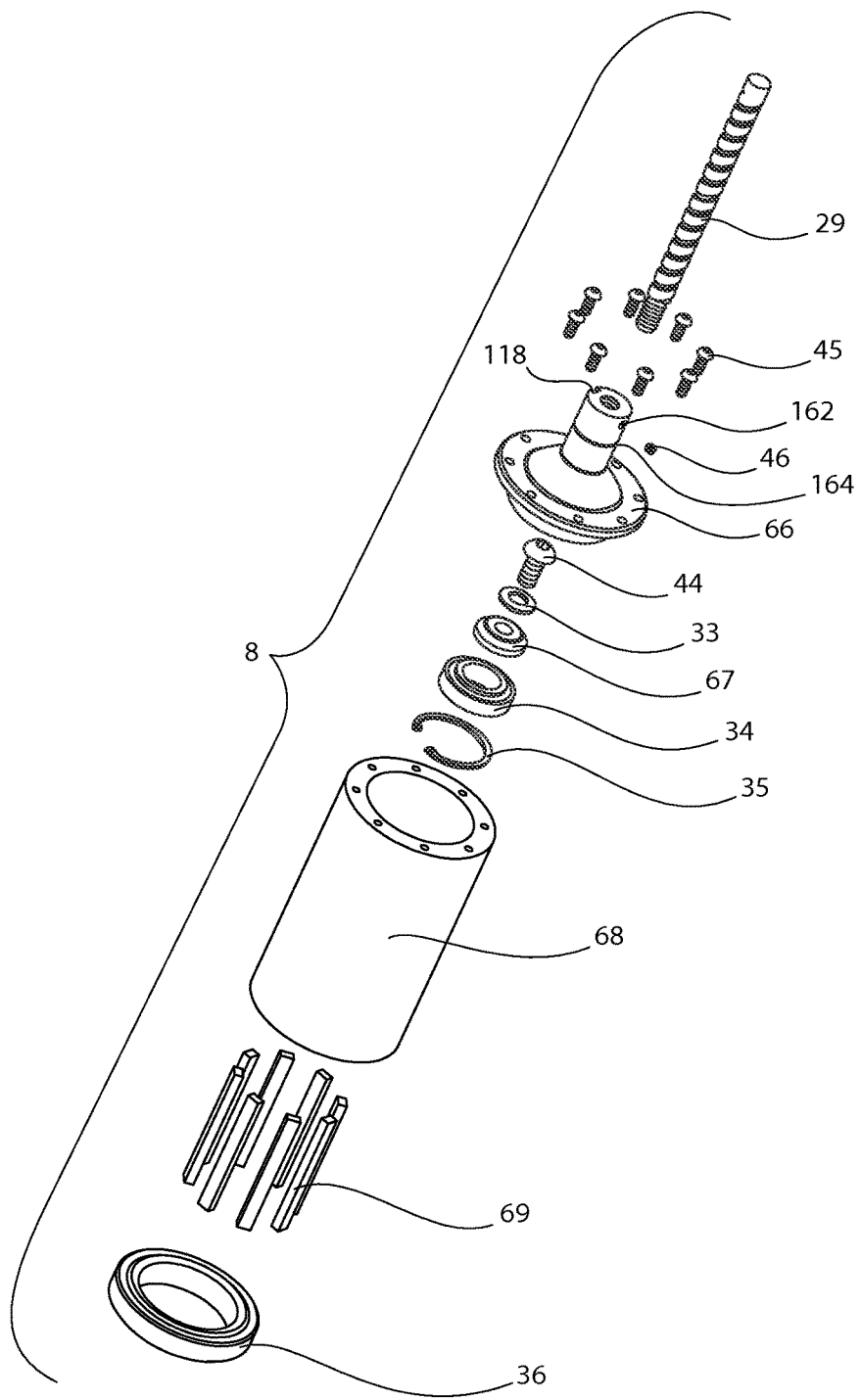
FIG. 13 is an exploded view of the outer magnetic assembly.
Figure 32:
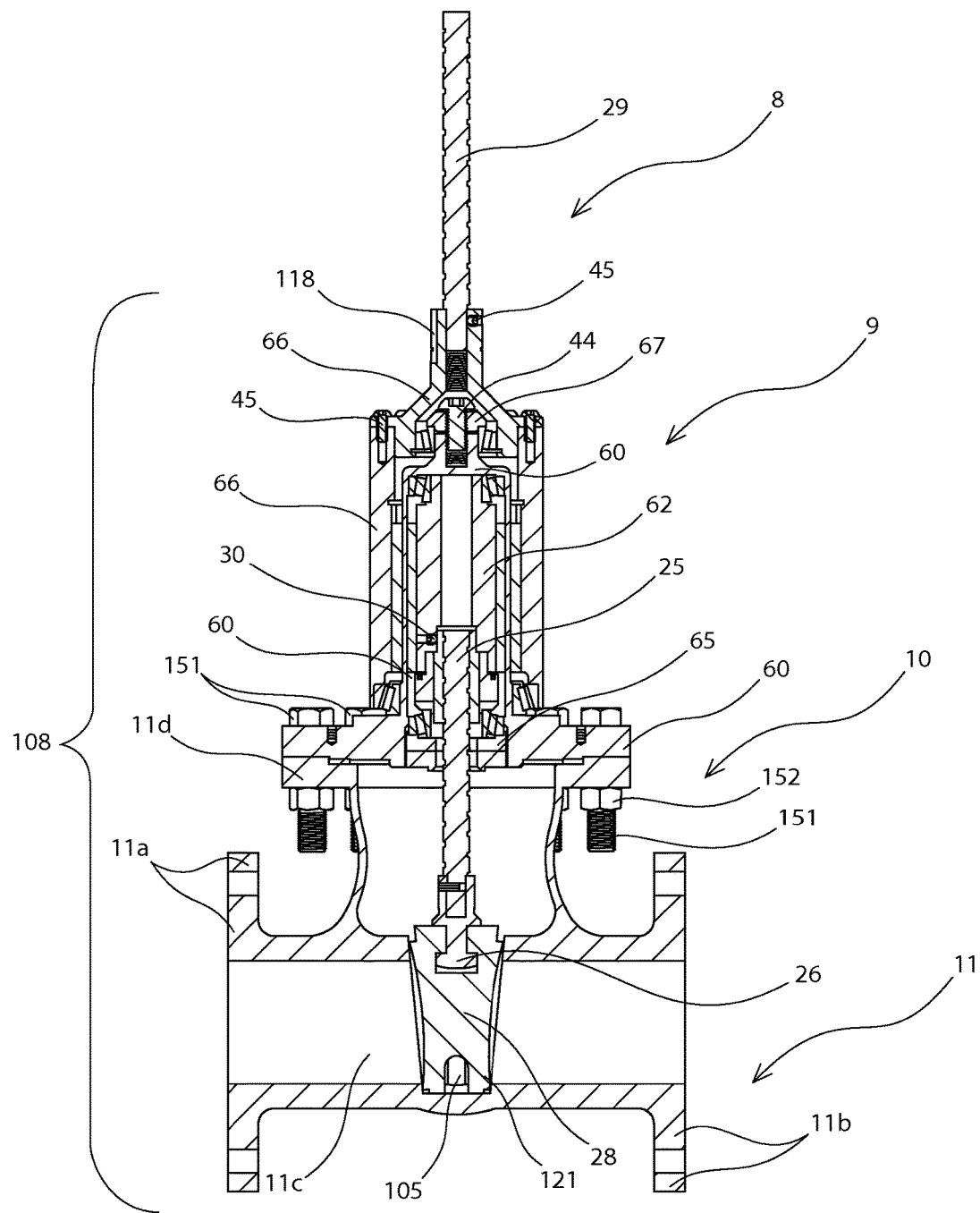
FIG. 32 is a section view of the outer magnetic assembly and sealed lower section.

FIG. 13 is an exploded view of the outer magnetic assembly. This figure shows the outer magnetic assembly 8, which rotates as a single unit. The bottom end of the ball screw 29 threads into the outer magnet top 66 and is secured with set screw 46. The outer magnet top 66 comprises a keyway 118, which receives the key 41 shown in FIG. 30; note that this particular part (the keyway 118) is relevant only in connection with the manual actuation embodiment shown in FIGS. 26-30. The outer magnet top 66 is bolted to the outer magnet carrier 68. A snap ring 35 is situated inside of the outer magnet top 66 (see also FIG. 14). To assemble the unit, the bolt 44, spring washer 33, retaining cap 67 and upper tapered roller bearing 34 are compressed together and inserted into the bottom of the outer magnet top 66. The snap ring 35 is inserted into a groove in the interior of the outer magnet top 66 to maintain these parts in place. The bolt 44 fastens the outer magnetic assembly 8 to the sealed lower section 108 (see FIG. 32). The outer magnets 69 are slipped inside of the outer magnet carrier 68 and held in place by magnetic force. Note that there are grooves inside of the outer magnet carrier 68 for receiving the outer magnets 69 (see FIG. 19). The lower tapered roller bearing 36 slides into the bottom of the outer magnet carrier 68 and into a recess on the inside of the outer magnet carrier 68 (see FIG. 14).

Figure 14:
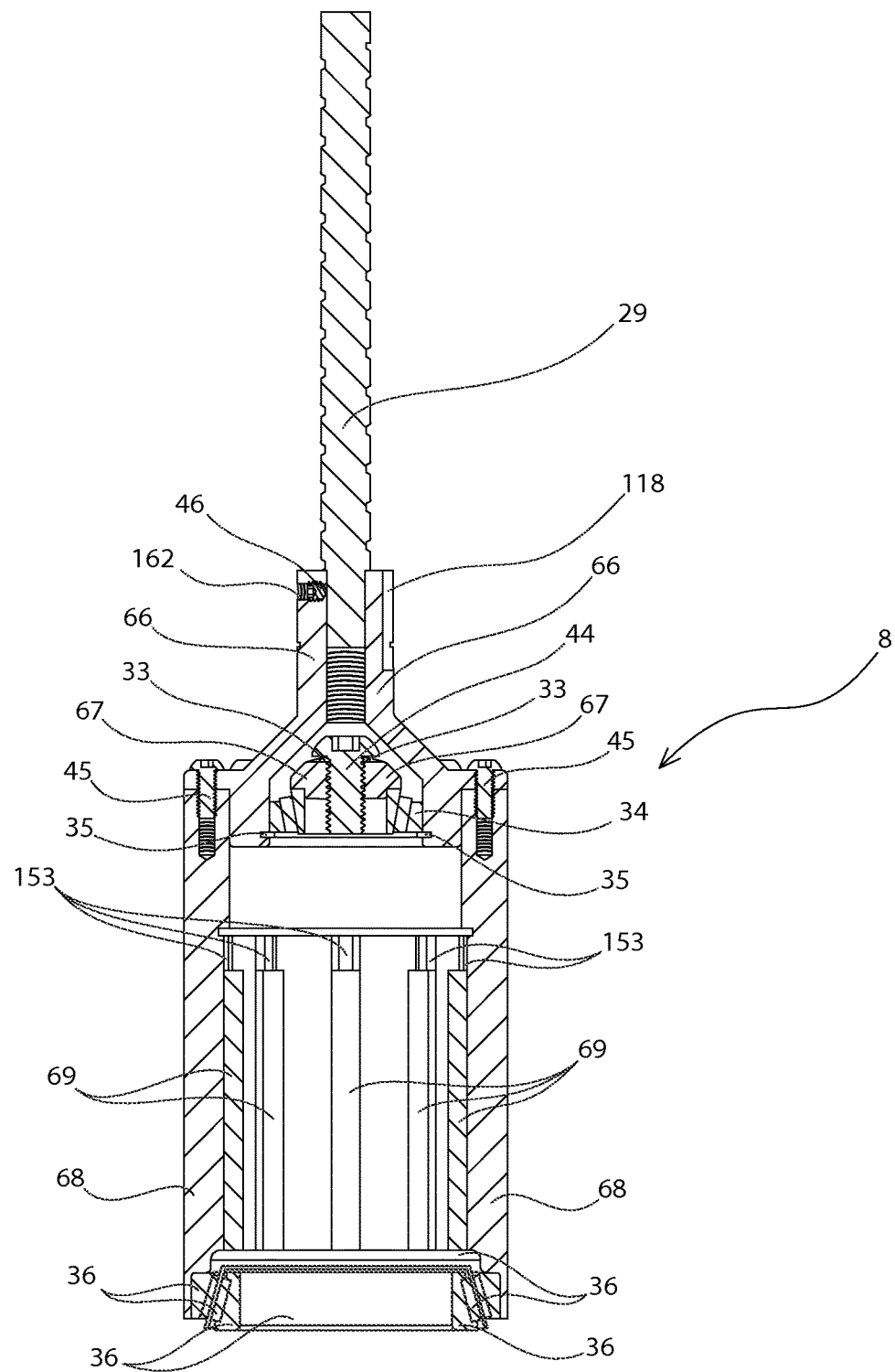
FIG. 14 is a section view of the outer magnetic assembly.

FIG. 14 is a section view of the outer magnetic assembly. Channels 153 on the inside of the outer magnet carrier hold the outer magnets 69 inside of the outer magnet carrier 68. In this figure, the channels 153 are longer than the magnets themselves 69; this is to accommodate longer magnets if greater torque is desired. Bolt 45 attaches the outer magnet top 66 to the outer magnet carrier 68. Tightening of bolt 44 ensures that the outer magnetic assembly 8 is concentric on the lower sealed section 108. The bolt 44 is preferably secured to the sealed lower section 108 with some manner of thread lock. The purpose of the upper and lower tapered roller bearings 34, 36 is to hold outer magnetic assembly 8 concentric to the magnet housing 60. Note that the outer magnet carrier 68 is constraining the outer race way of the lower tapered roller bearing 36, and the magnet housing 60 is constraining the inner raceway of the lower tapered roller bearing 36. The inner raceway of the upper tapered roller bearing 34 is constrained by the magnet housing 60, and the outer raceway of the upper tapered roller bearing is constrained by the outer magnet top 66, which is concentrically and fixedly attached to the outer magnet carrier 68.

Figure 15:
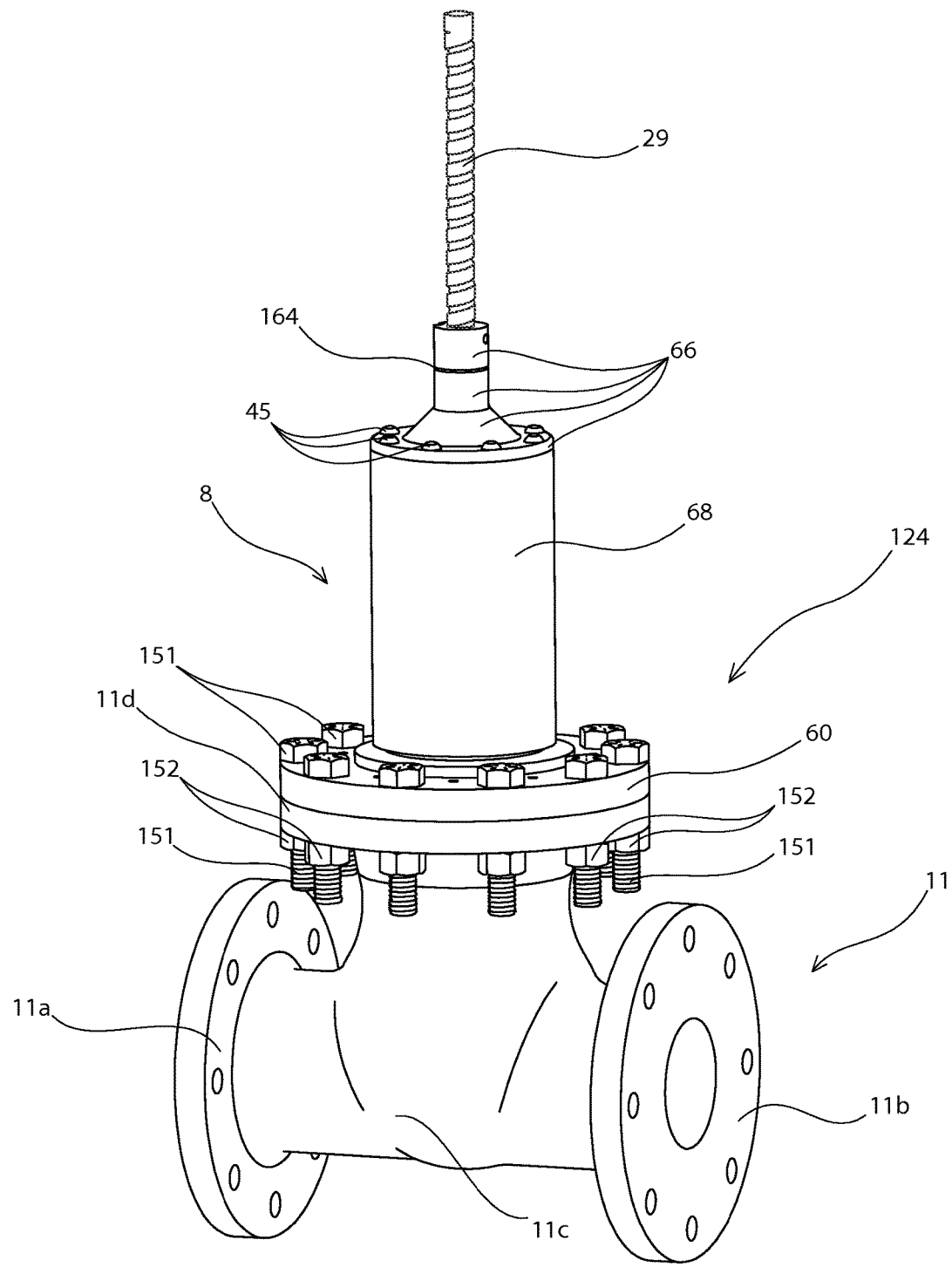
FIG. 15 is a perspective view of the sealed lower section with valve body and outer magnetic assembly.

FIG. 15 is a perspective view of the sealed lower section with valve body and outer magnetic assembly. In this figure, the parts shown in FIGS. 9 and 12 have been combined to form the assembly shown in FIG. 15. The bolt 44 (see FIG. 14) is inserted into the threaded hole on the top of the magnet housing 60 to secure the outer magnetic assembly 8 to the lower sealed section 108 (see FIG. 32).

Figure 16:
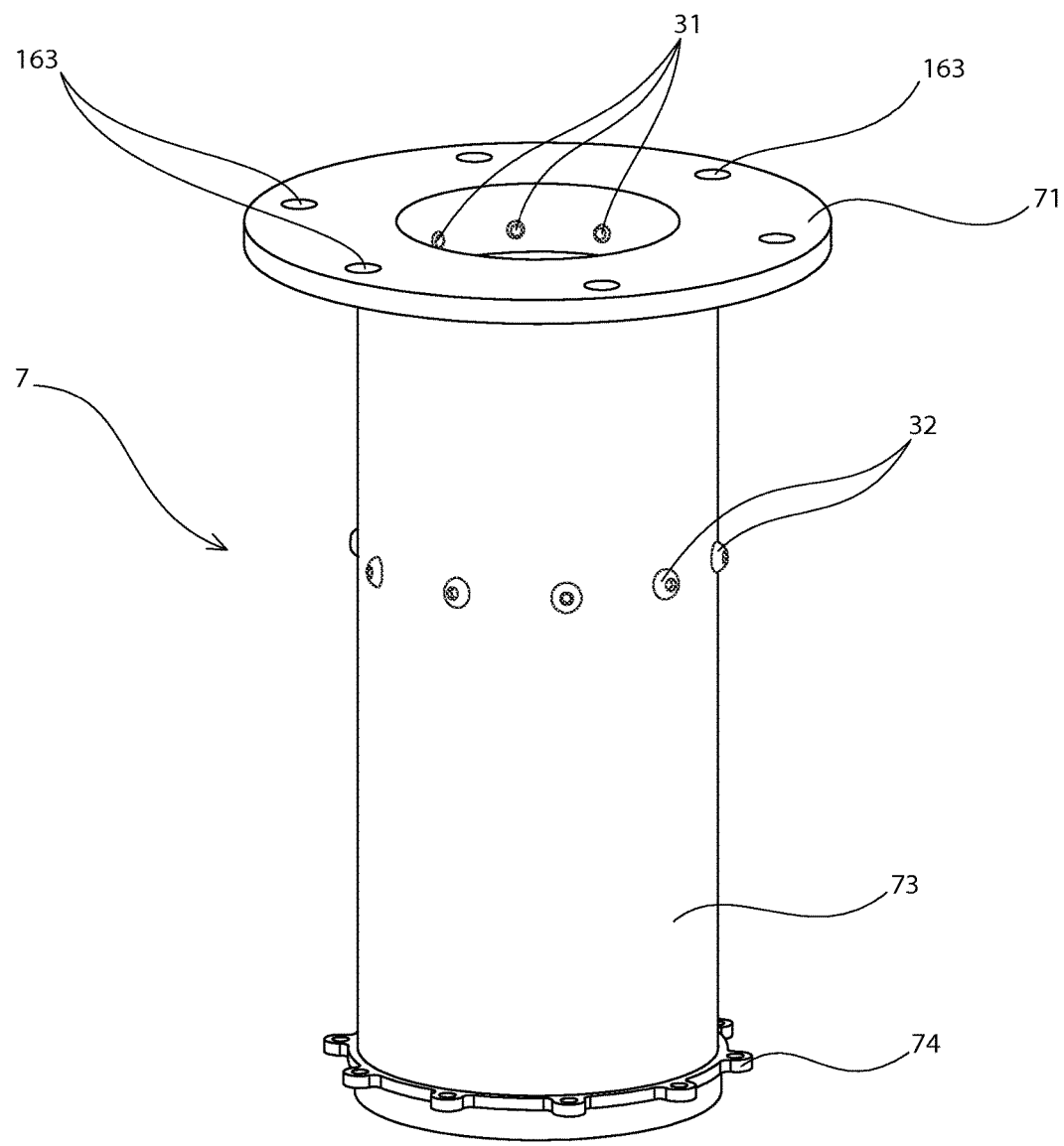
FIG. 16 is a perspective view of the pneumatic actuator mounting assembly.

FIG. 16 is a perspective view of the pneumatic actuator mounting assembly. This figures shows the mount can 73 and retaining ring 74. The purpose of the mount can 73 is to mount the pneumatic piston 120 so that it can move up and down. The mount can 73 is placed over the top of outer magnetic assembly 8 shown in FIG. 15, and then the retaining ring 74 is placed onto the bottom end of the mount can 73. Bolts are used to fasten the retaining ring 74 to the bottom flange of the magnet housing 60 (see holes in flange in FIG. 15 for receiving these bolts).

Figure 17:
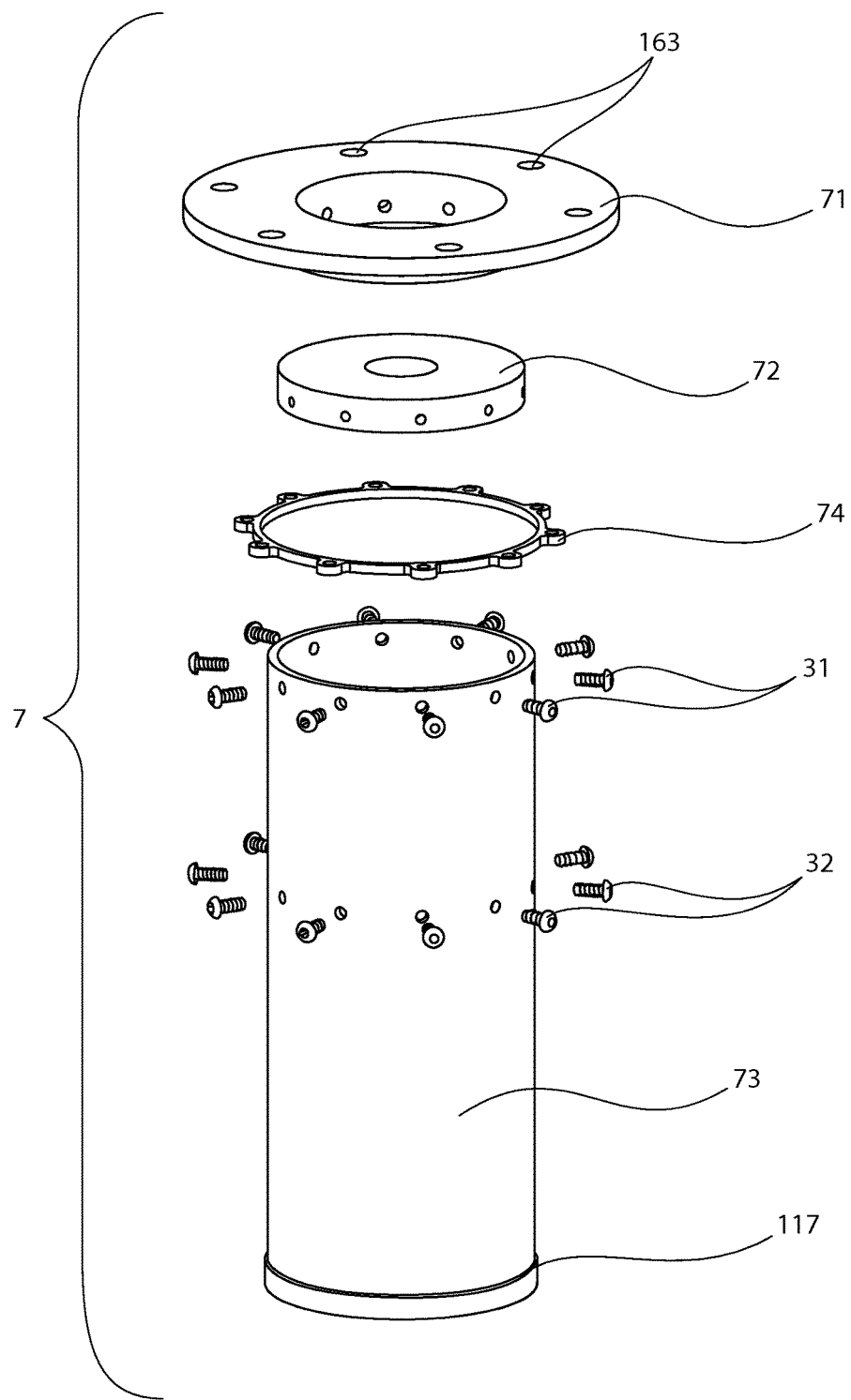
FIG. 17 is an exploded view of the pneumatic actuator mounting assembly.

FIG. 17 is an exploded view of the pneumatic actuator mounting assembly. The mount can top 71 is mounted via bolt holes 163 to the bottom of the pneumatic actuator assembly 6 (see FIG. 23). The mount can divider 72 is an optional feature and is inserted just inside the top of the mount can 73 to prevent flames from coming into contact with the outer magnet assembly during fire-testing of the valve.

Figure 18:
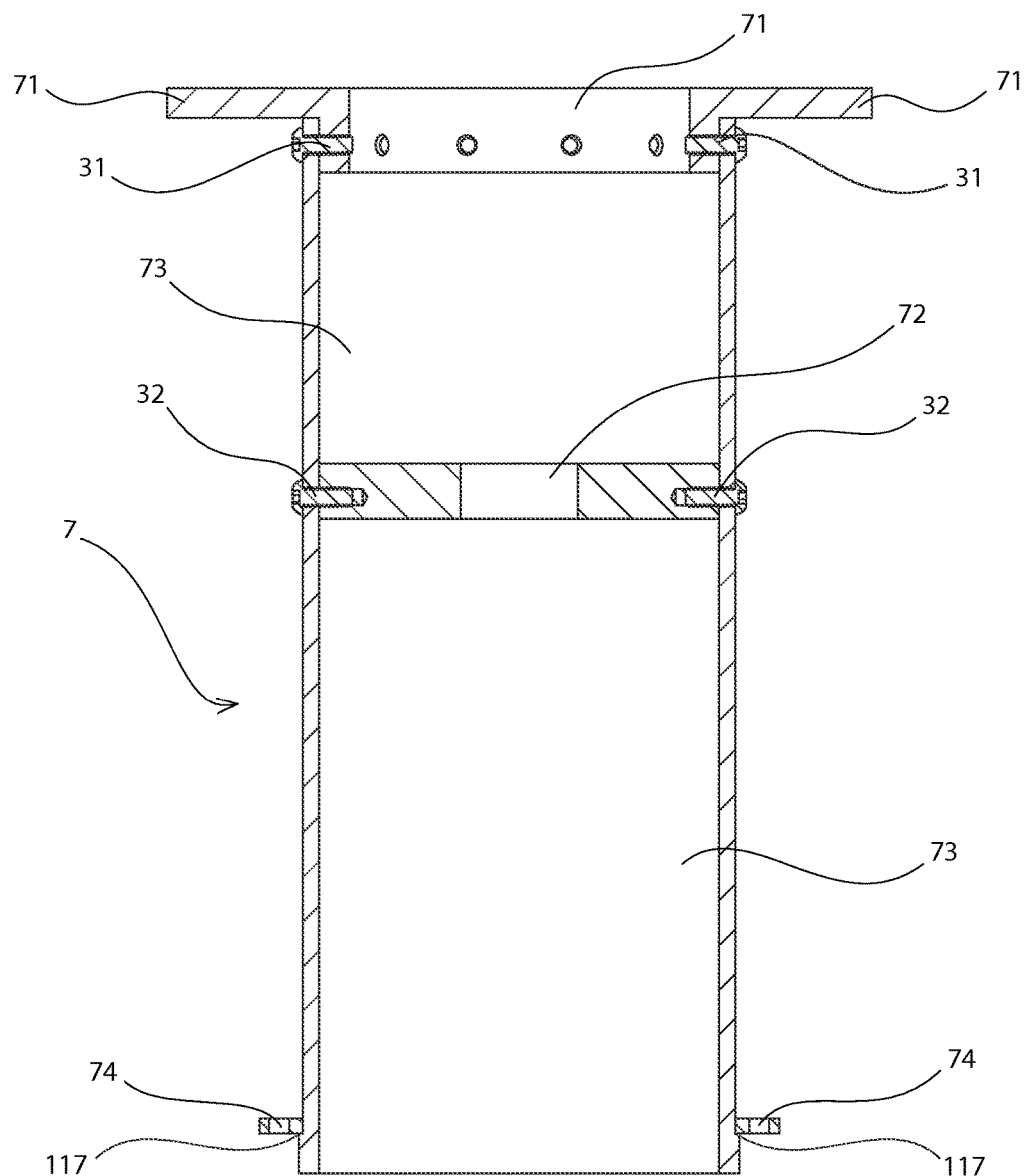
FIG. 18 is a section view of the pneumatic actuator mounting assembly.

FIG. 18 is a section view of the pneumatic actuator mounting assembly. The mount can 73 preferably has a shoulder 117 machined into it at the bottom end of the mount can 73; this shoulder 117 holds the retaining ring 74 shown in FIG. 17.

Figure 19:
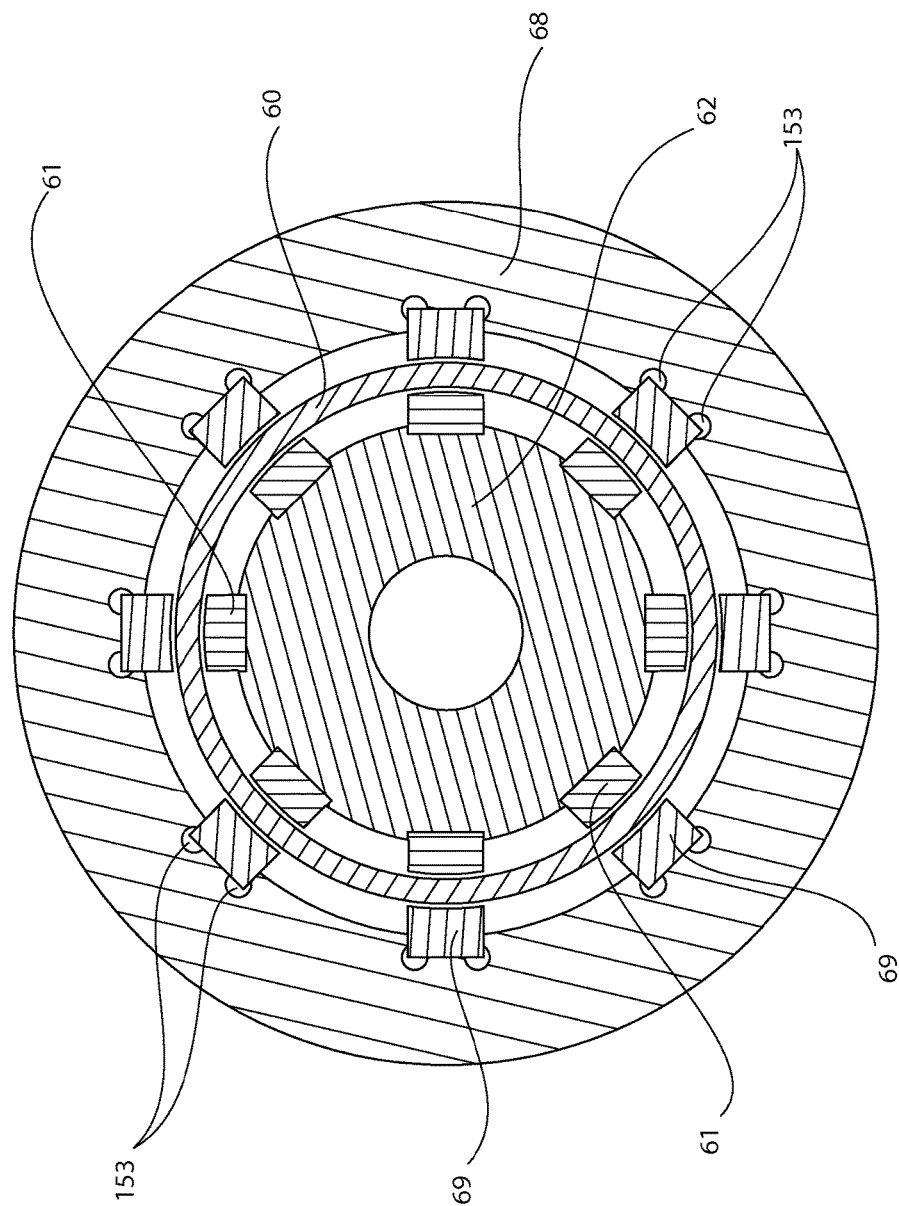
FIG. 19 is a top view of the magnetic coupling between the outer magnetic assembly and the inner magnetic cartridge assembly.

FIG. 19 is a top view of the magnetic coupling between the outer magnetic assembly and the inner magnetic cartridge assembly. As shown in this figure, the inner magnets 61, which are held by the inner magnet carrier 62, are configured so that they align radially with the outer magnets 69. In this manner, there is a magnetic coupling between the outer and the inner magnets such that when the outer magnet carrier 68 is rotated, thereby causing the outer magnets to rotate, the inner magnets and inner magnet carrier 62 rotate as well.

In a preferred embodiment, the inner and outer magnets are SmCo grade to accommodate −423 to +500 degrees Fahrenheit and magnetized across the full dimension of their thickness (i.e., from outside to inside). The inner and outer magnets are preferably flat on one side and slightly curved on the other side. As shown in FIG. 19, the flat side of the inner magnets 61 faces inward toward the inner magnet carrier 62, and the slightly curved (convex) side of the inner magnets 61 faces the magnet housing 60. Similarly, the flat side of the outer magnets 69 faces the outer magnetic carrier 68, and the slightly curved (concave) side of the outer magnets 69 faces the magnet housing 60.

Figure 20:
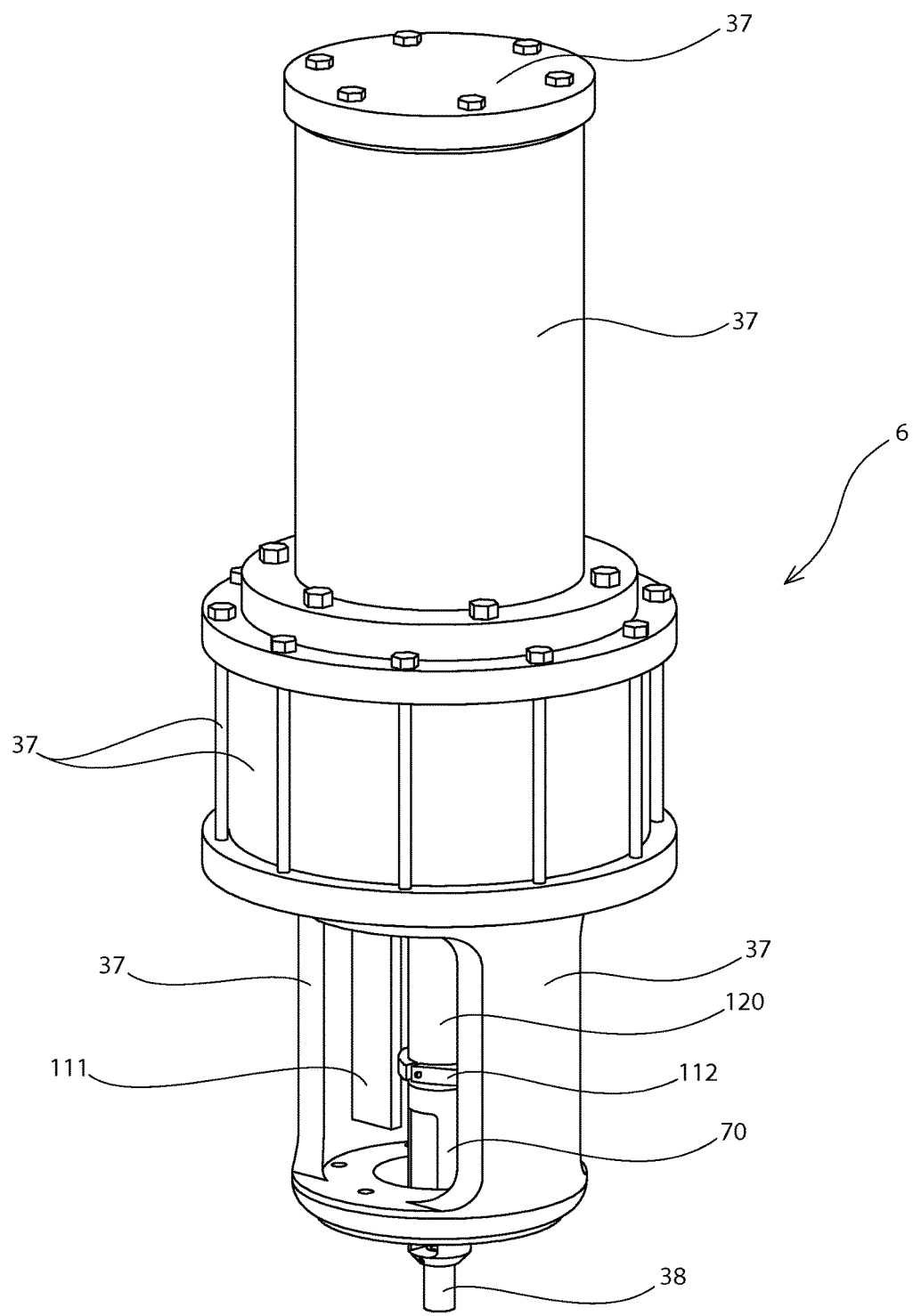
FIG. 20 is a perspective view of the pneumatic actuator assembly.
Figure 21:
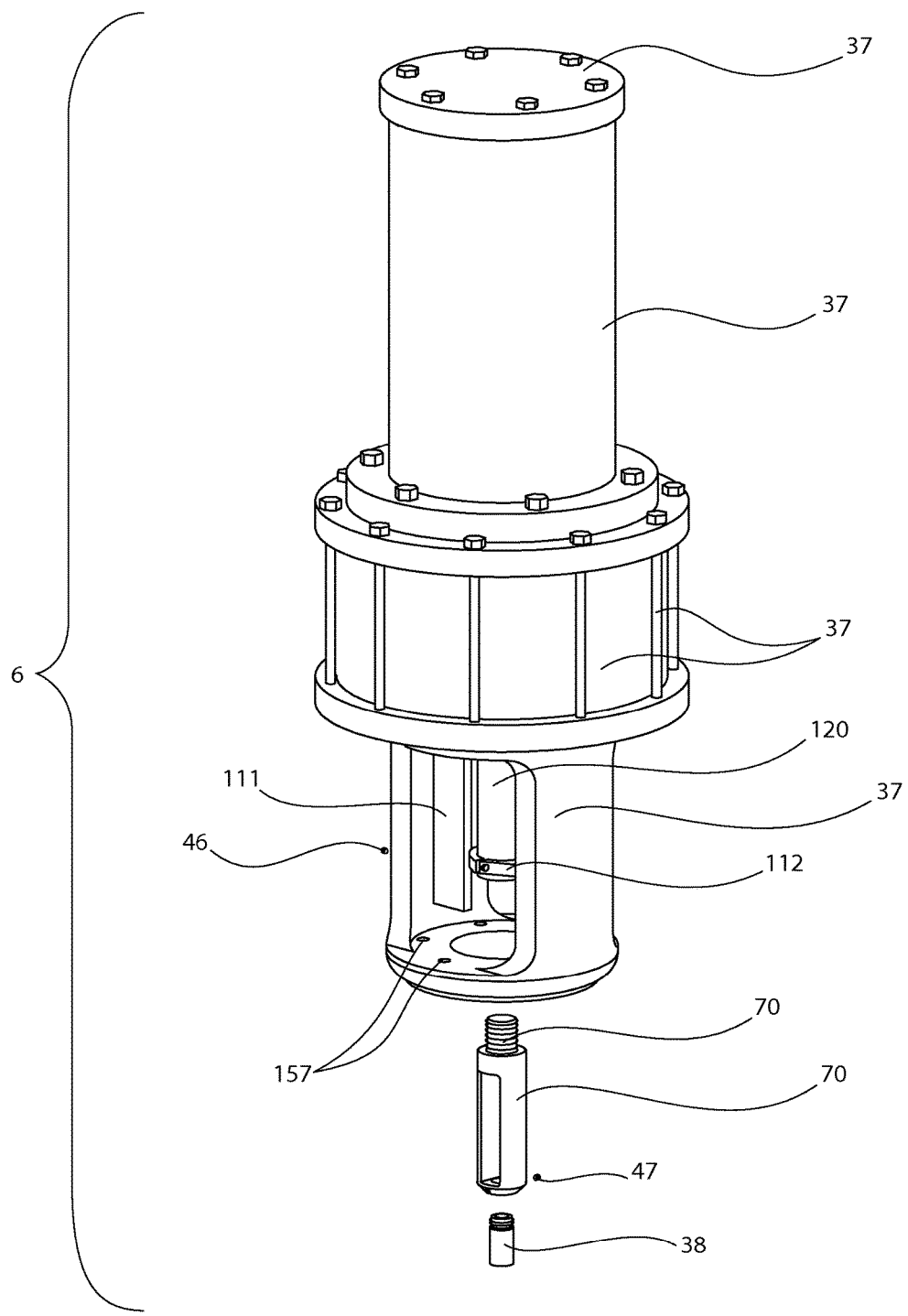
FIG. 21 is an exploded view of the pneumatic actuator assembly.

FIG. 20 is a perspective view of the pneumatic actuator assembly. The pneumatic actuator assembly 6 is comprised of the pneumatic actuator 37, an upper ball nut 38, and a ball nut mount 70. Referring to FIG. 21, the top end of the upper ball screw 29 (see FIG. 12) threads into the ball nut 38, which threads into the bottom of the ball nut mount 70. Set screw 47 secures the ball nut 38 to the ball nut mount 70 so that it cannot rotate independently of the ball nut mount 70. The ball nut 38 moves up and down but does not rotate (whereas the entire assembly shown in FIG. 12 rotates); as the ball nut 38 moves up and down, it forces the upper ball screw 29 to rotate. The ball nut mount 70 threads into the pneumatic piston 120 and is held in place by set screw 46 (see FIG. 21). A pneumatic shall guide (in the form of a protruding ridge) 111 on the inside of the pneumatic actuator 37 interacts with the clamp-on guide 112 so that the clamp-on guide rides up and down the guide 111 and prevents the pneumatic piston 120 from rotating (see FIG. 22). Once the ball nut mount 70 is securely fastened to the pneumatic piston 120, the piston 120 moves up and down within the pneumatic actuator 37 as air pressure is applied.

FIG. 21 is an exploded view of the pneumatic actuator assembly. The pneumatic actuator 37 is mounted to the mount can top 71 (shown in FIG. 16) via bolt holes 157 (in FIG. 21) and 163 (in FIG. 16).

Figure 22:
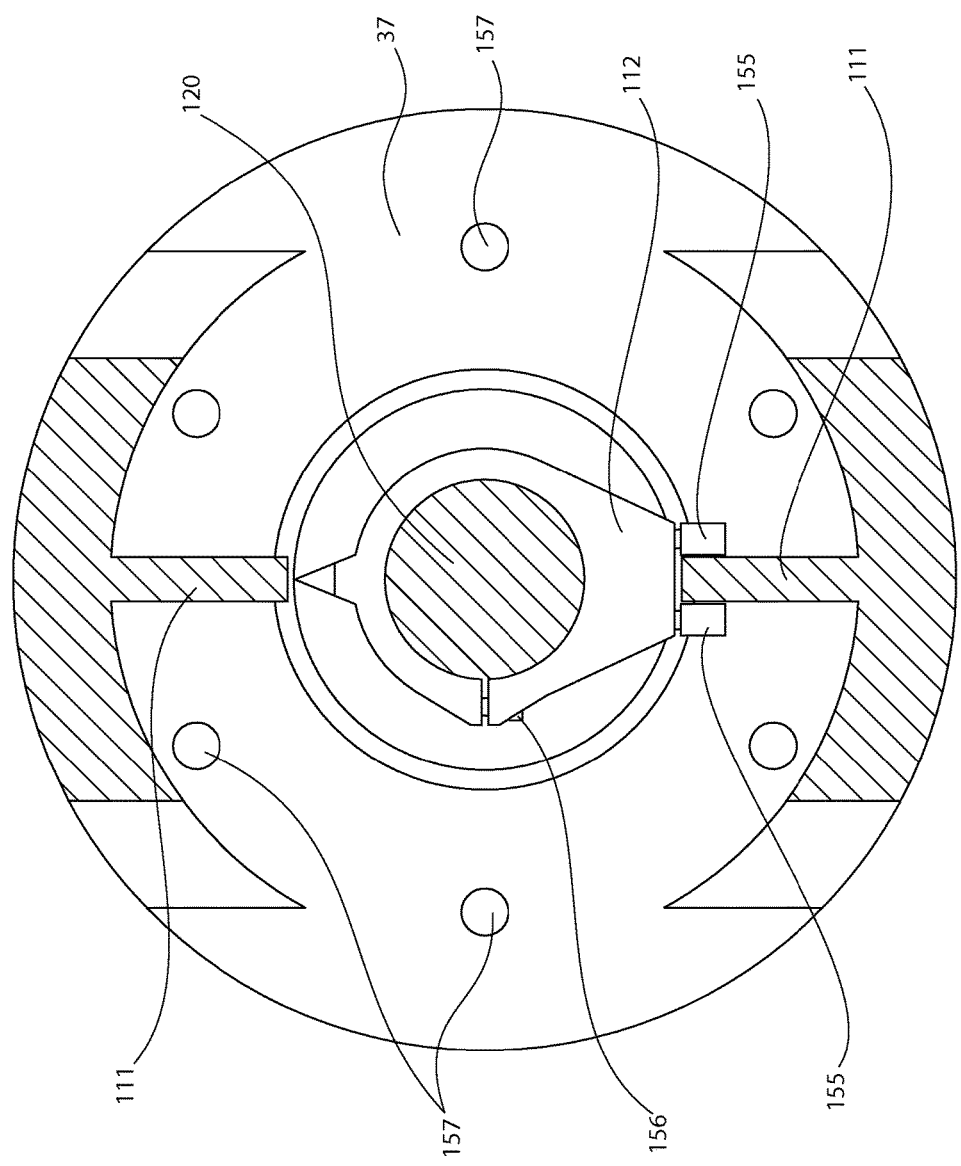
FIG. 22 is a top section view of the pneumatic actuator rotational stop.

FIG. 22 is a top section view of the pneumatic actuator rotational stop. Guide rollers 155 are a pair of roller bearings that ride up and down the protruding ridge 111 on the inside of the pneumatic actuator 37, ensuring that the pneumatic piston 120 does not rotate. The roller bearings 155 are bolted to the clamp-on guide 112.

Figure 23:
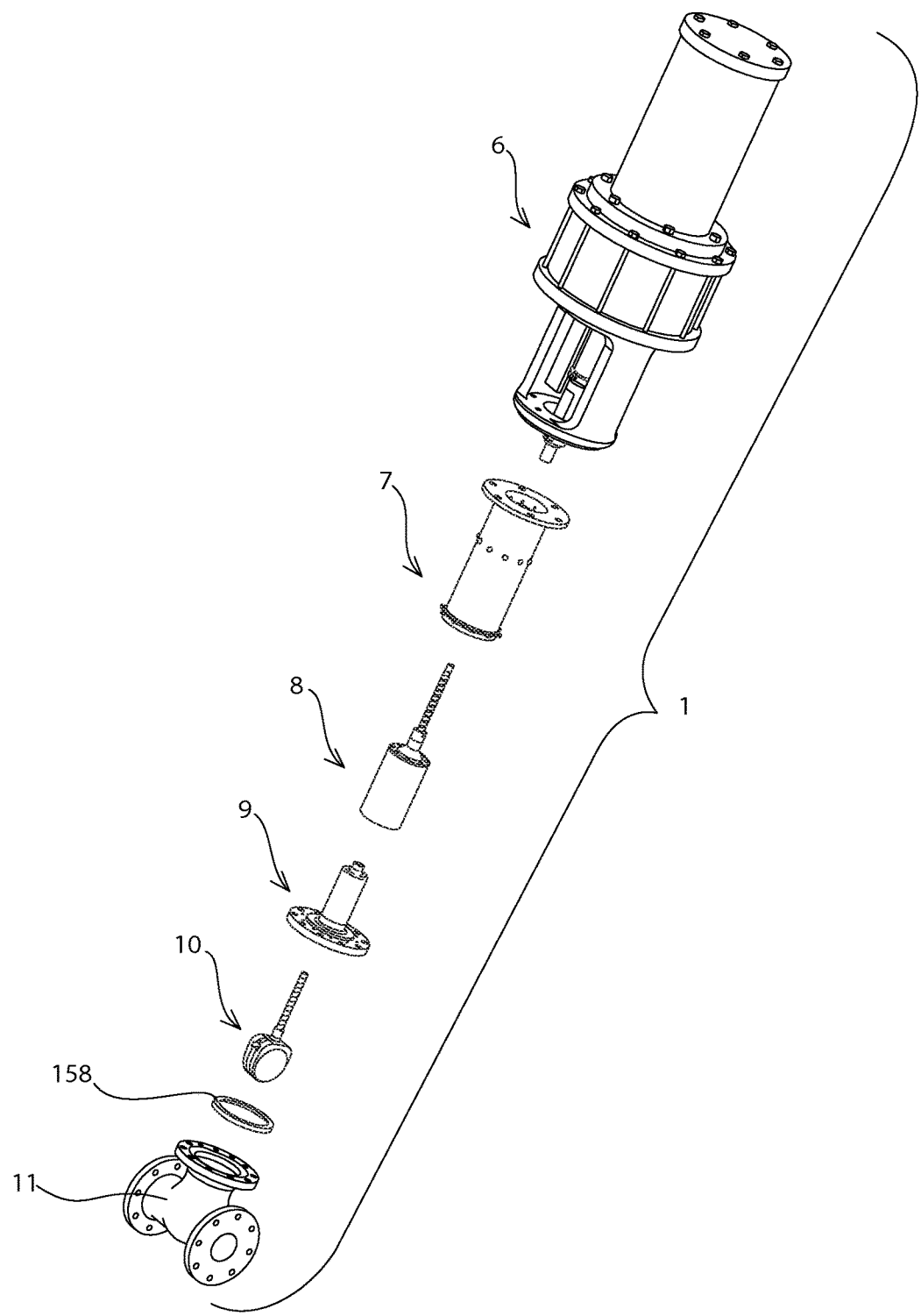
FIG. 23 is an exploded view of the present invention with the pneumatic actuator.

FIG. 23 is an exploded view of the present invention with the pneumatic actuator. All of the parts referenced in this figure are shown in an assembled state in FIG. 1. The valve body 11, flange gasket 158, inner magnetic cartridge assembly 9, pneumatic actuator mount assembly 7, and pneumatic actuator assembly 6 are all mounted as a single unit and not able to rotate. The pneumatic actuator assembly 6 contains the pneumatic piston 120, which moves up and down.

Figure 24:
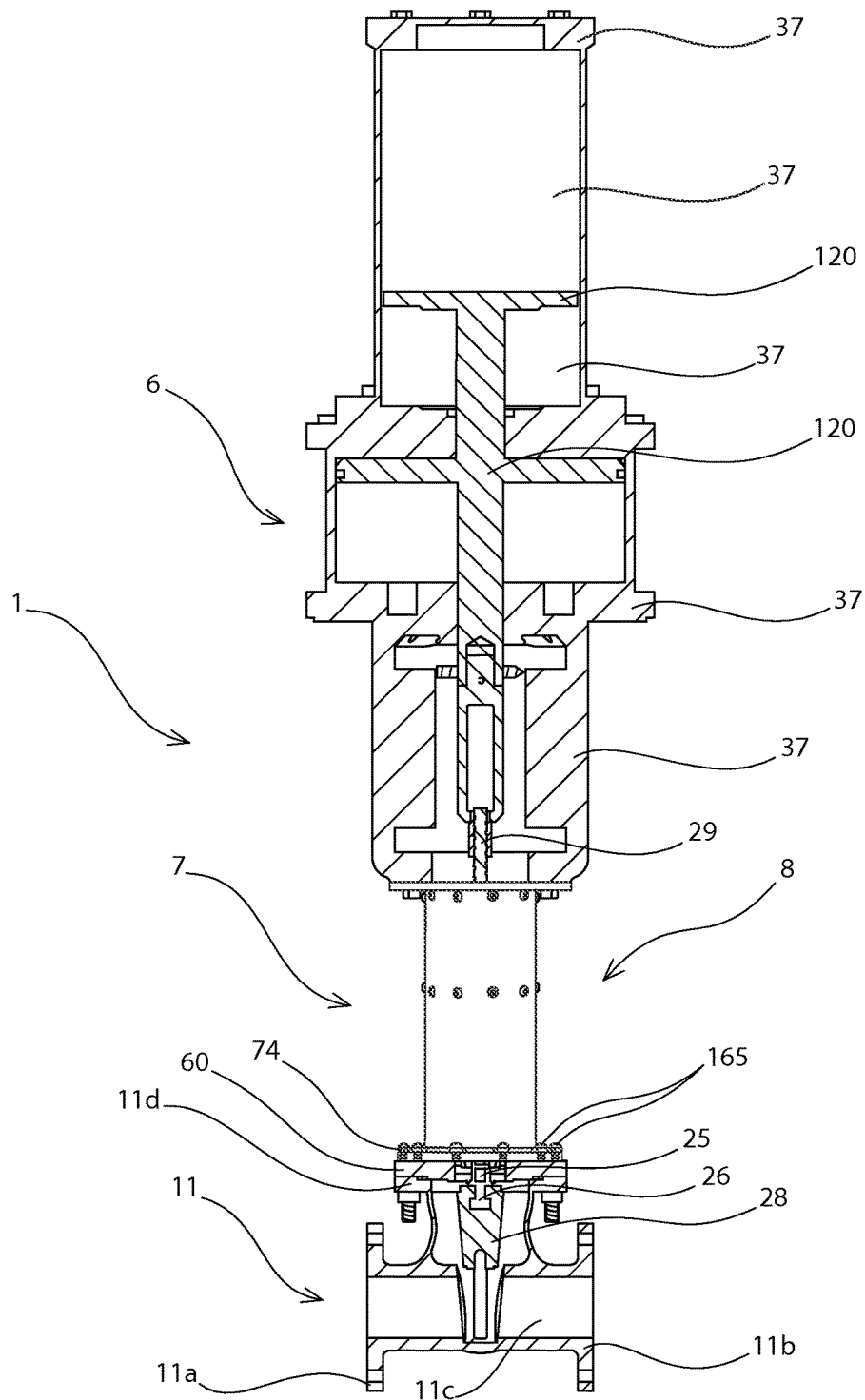
FIG. 24 is a section view of the present invention shown with the valve in an open position.

FIG. 24 is a section view of the present invention shown with the valve in an open position. As compared to FIG. 11, the following parts have been added: pneumatic actuator assembly 6, pneumatic actuator mount assembly 7, and outer magnetic assembly 8.

Figure 25:
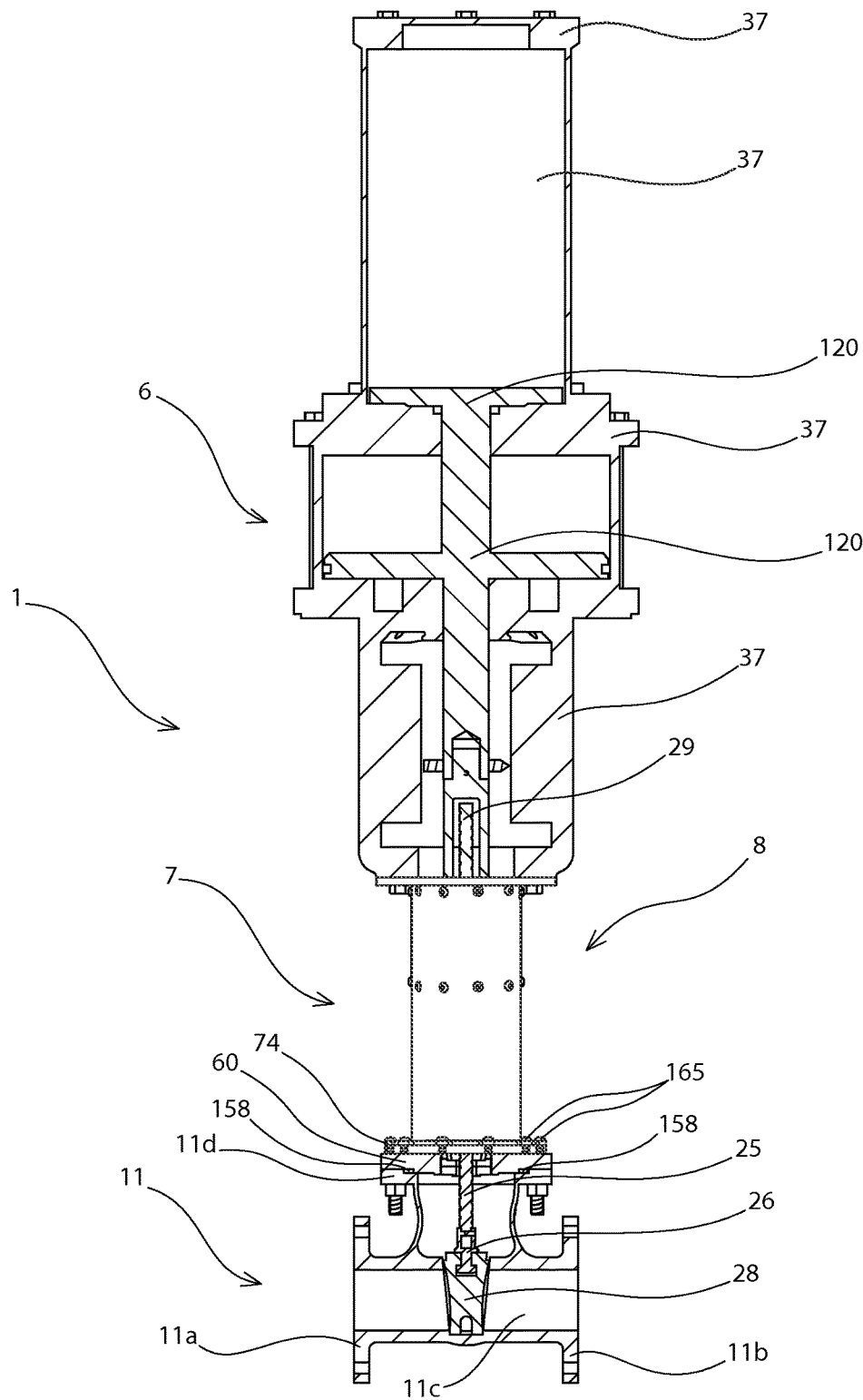
FIG. 25 is a section view of the present invention shown with the valve in a closed position.

FIG. 25 is a section view of the present invention shown with the valve in a closed position. As compared to FIG. 10, the following parts have been added: pneumatic actuator assembly 6, pneumatic actuator mount assembly 7, and outer magnetic assembly 8.

Figure 26:
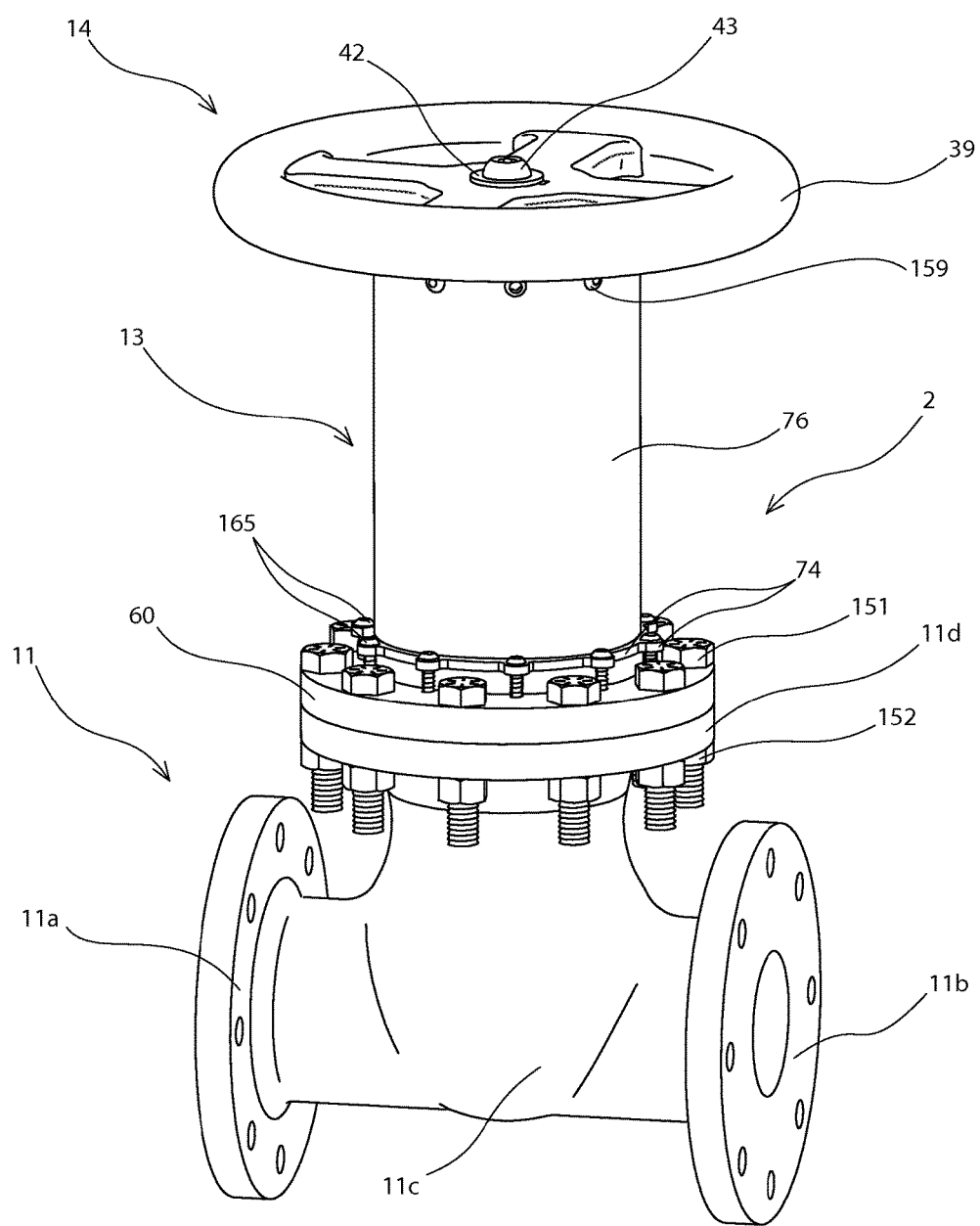
FIG. 26 is a perspective view of the present invention fully assembled with a manual actuator.

FIG. 26 is a perspective view of the present invention fully assembled with a manual actuator. In lieu of the pneumatic actuator shown in the preceding figures, this embodiment incorporates a manual actuator. Specifically, the mount can 73 shown in FIG. 17 has been replaced with the alternate mount can 76 shown in FIG. 28. The alternate mount can 76 is preferably shorter than the mount can 73 because it contains fewer parts.

Figure 27:
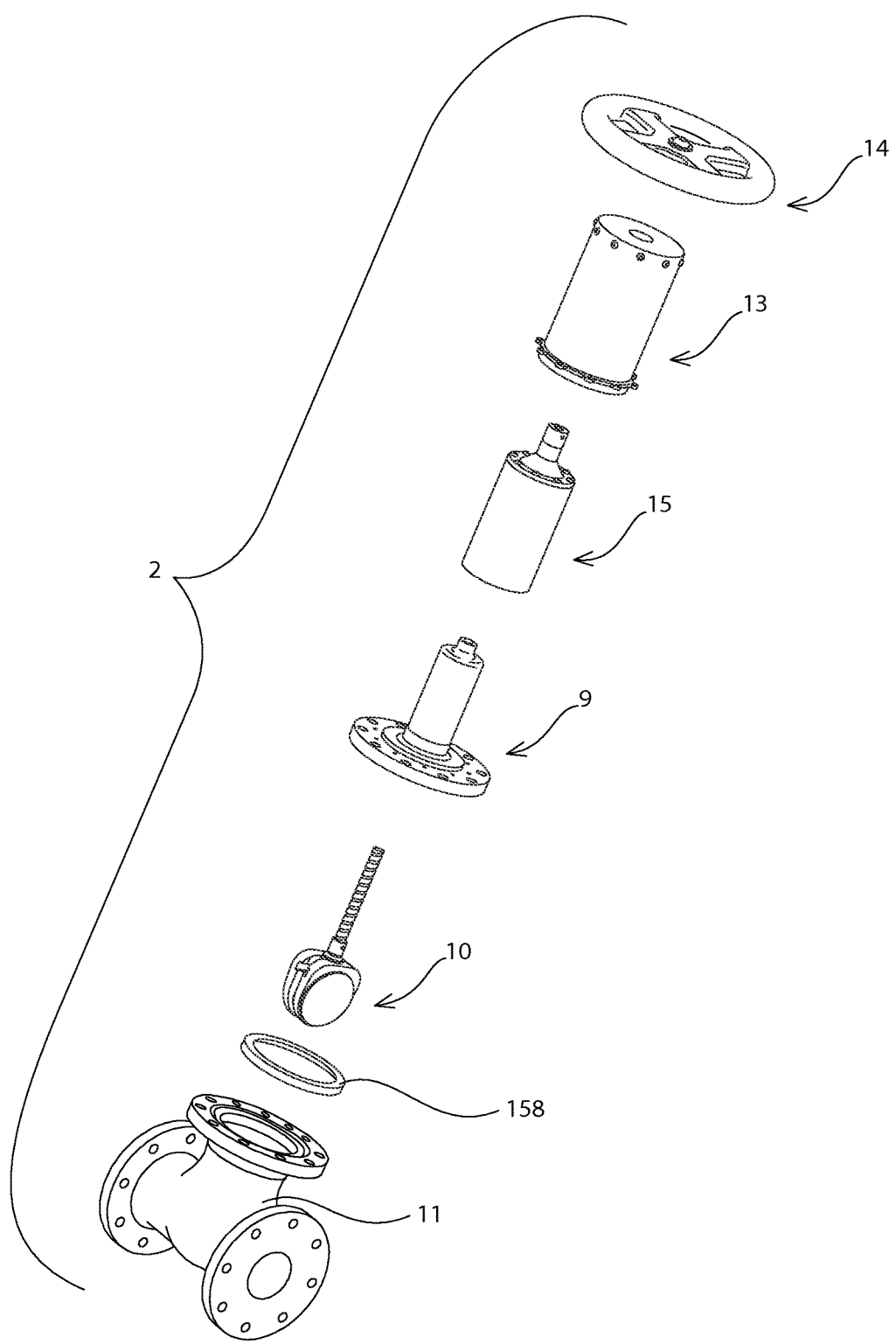
FIG. 27 is an exploded view of the present invention with the manual actuator.

FIG. 27 is an exploded view of the present invention with the manual actuator. All parts are the same as previously described, except that the handle assembly 14 has been added in lieu of the pneumatic actuator assembly 6, and the pneumatic actuator mount assembly 7 has been replaced with the manual actuator mount assembly 13. As compared to FIG. 23, the pneumatic actuator assembly 6, the pneumatic actuator mount assembly 7, and the outer magnetic assembly 8 have been removed. The outer magnetic assembly 15 is similar to the outer magnetic assembly 8 of FIG. 23, except that the upper ball screw 29 has been eliminated. The manual actuator mount assembly 13 is similar to the pneumatic actuator mount assembly 7 except that the top of the mount can 73 has been removed so that the top of the alternate mount cart 76 is flush with the mount can divider 72 (see FIG. 17). Note that the bolt line shown at the top of the alternate mount can 76 is the same bolt line shown in the center of the mount can 73 in FIG. 17. (In FIG. 17, the mount can divider 72 is pushed downward within the mount can 73 so that the bolt holes of the mount can divider are aligned with this bolt line.) The inner magnetic cartridge assembly 9, gate assembly 10, flange gasket 158 and valve body 11 are the same as described previously.

Figure 28:
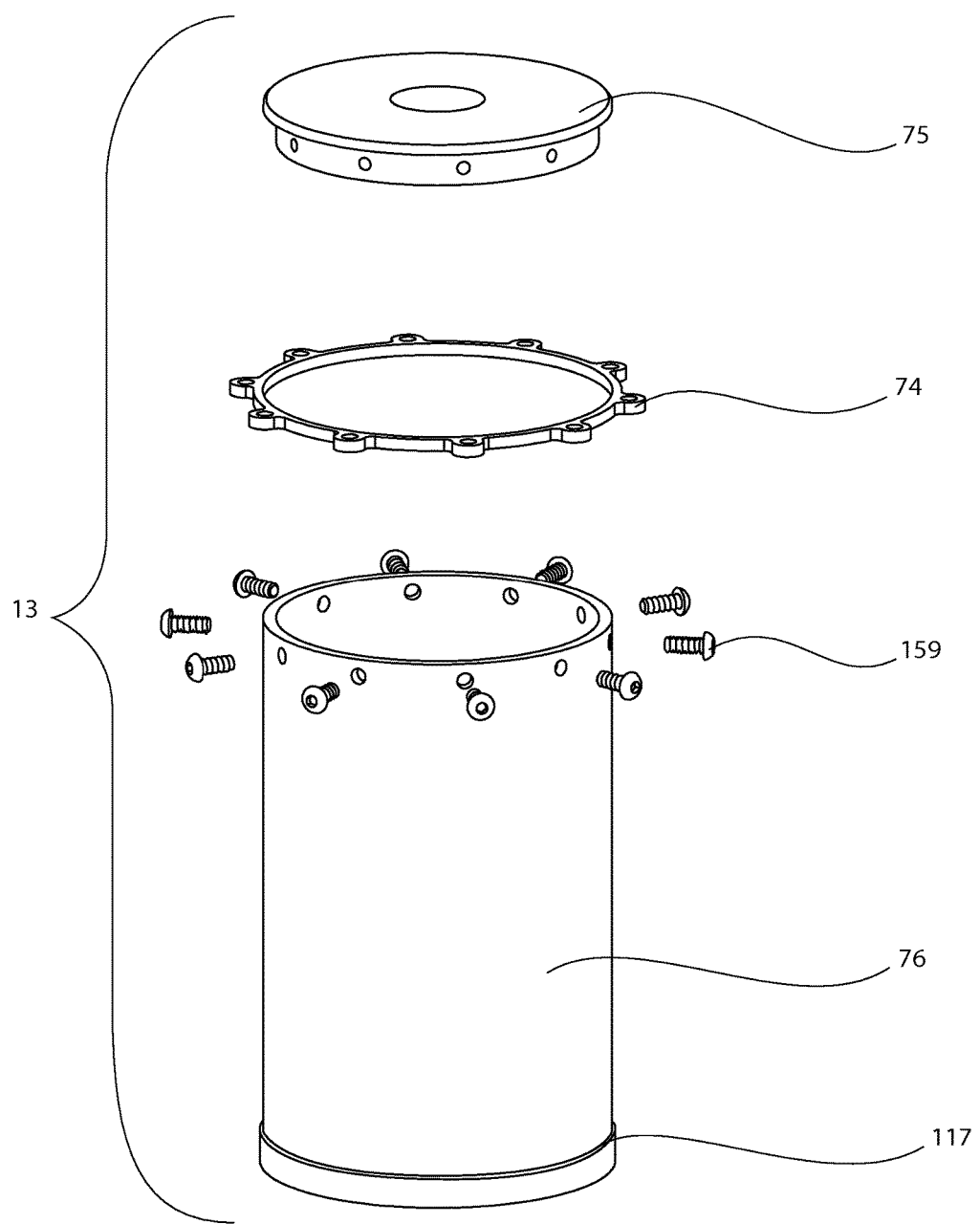
FIG. 28 is an exploded view of the manual actuator mount assembly.

FIG. 28 is an exploded view of the manual actuator mount assembly. Note that the mount can top 75 differs from the mount can divider 72 in that the top surface of the mount can top 75 has been extended so that it covers the top edge of the alternate mount can 76.

Figure 29:
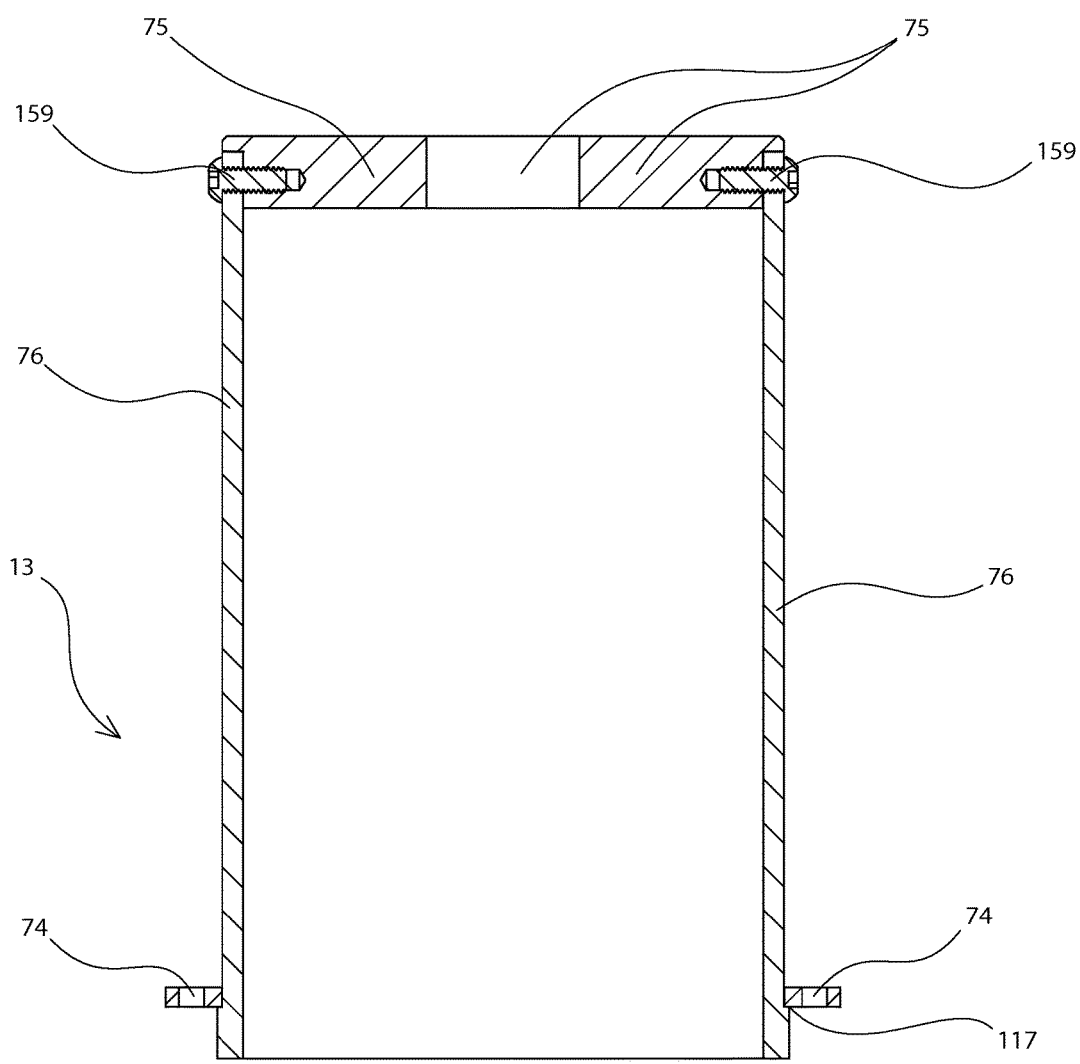
FIG. 29 is a section view of the manual actuator mount assembly.

FIG. 29 is a section view of the manual actuator mount assembly. This figure shows the parts shown in FIG. 28 fully assembled. The alternate mount can 76 is secured to the mount can top 75 with bolts 159.

Figure 30:
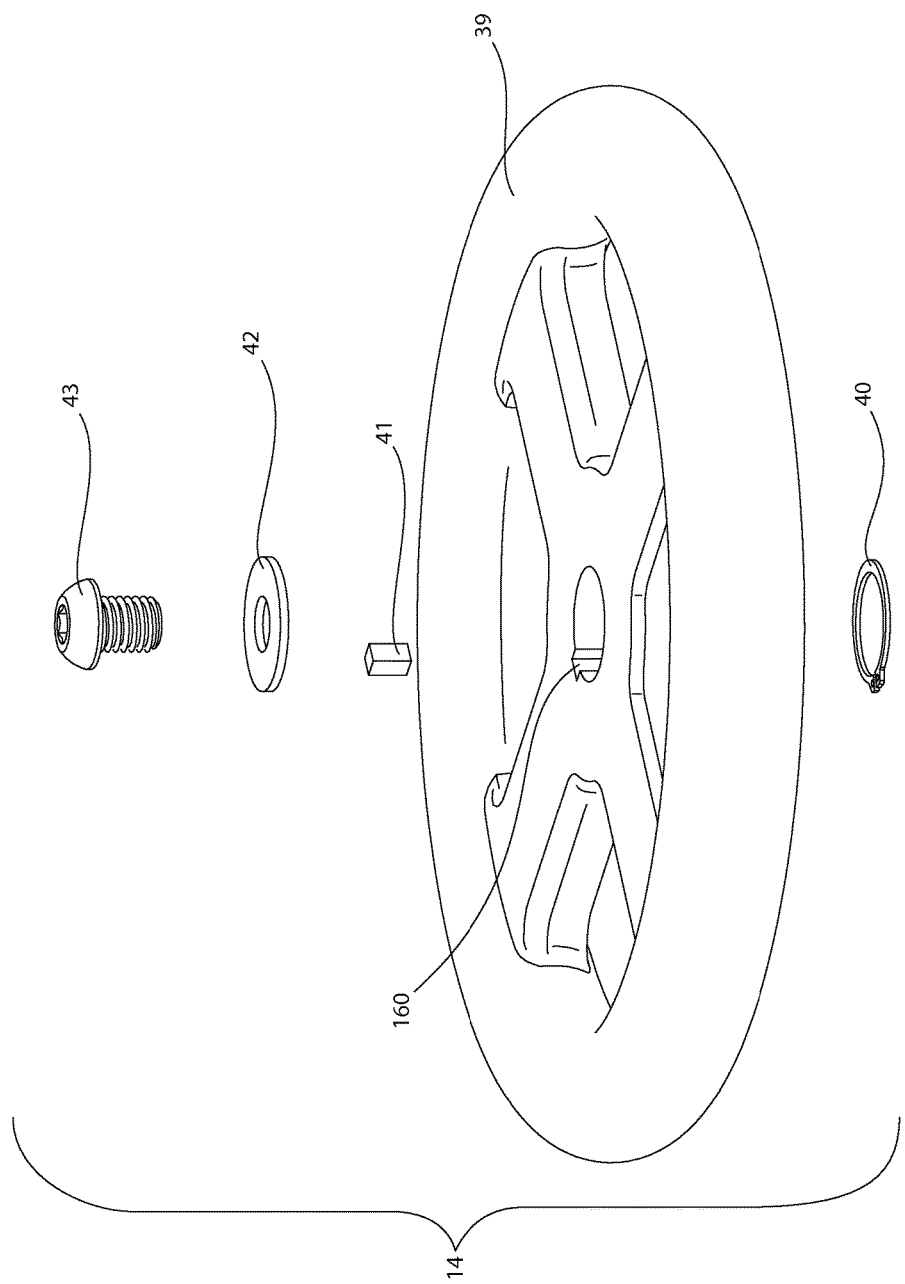
FIG. 30 is an exploded view of the manual actuator handle.

FIG. 30 is an exploded view of the manual actuator handle. Referring to FIG. 15, the snap ring 40 fits into the groove 164 in the outer magnet top 66. Once this is snapped into place, the handle 39 shown in FIG. 30 slips on top of the snap ring 40. The diameter of the hole in the center of the handle 39 is the same as the outer diameter of the top part of the outer magnet top 66. The snap ring 40 creates a shoulder on which the handle 39 sits. The washer 42 rests on the top surface of the handle 39 in the center of the handle, directly above the hole. The retaining bolt 43 threads into the hole in the top of the outer magnet top 66 (see FIG. 13). The key 41 fits into the key way 160 in the center hole of the handle and also into the keyway 118 in the outer magnet top 66 (see FIG. 13). As such, when the handle 39 is rotated (either manually or via a motor or other source of kinetic energy), the outer magnet top 66 and outer magnet carrier 68 rotate, thereby causing the inner magnets 61 and inner magnet carrier 62 to rotate, as described above.

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A rising stem valve comprising:
   (a) a pneumatic actuator assembly comprised of a pneumatic actuator, an upper ball nut, and a ball nut mount, wherein the upper ball nut threads into a bottom end of the ball nut mount, and the ball nut mount threads into a pneumatic piston, the upper ball nut being configured to move up and down with the pneumatic piston;
   (b) a valve body comprised of a top flange;
   (c) a gate assembly with a lower ball screw, a gate mount and a gate, wherein a bottom end of the lower ball screw resides within the gate mount, and a lower portion of the gate mount is inserted into a guide channel in the gate;
   (d) an inner magnetic cartridge assembly comprised of a magnet housing and an inner magnetic cartridge, wherein the inner magnetic cartridge is comprised of an inner magnet carrier around which a plurality of inner magnets are arranged radially and spaced apart from one another, and wherein the inner magnetic cartridge resides within the magnet housing;
   (e) an outer magnetic assembly comprised of an outer magnet carrier and an outer magnet top that is fixedly secured to the outer magnet carrier, a plurality of outer magnets held within the outer magnet carrier, the outer magnets being magnetically coupled to the inner magnets so that when the outer magnets rotate, the inner magnets rotate in a same direction; and
   (f) an upper ball screw with a top end that threads into the upper ball nut so that the upper ball screw rotates as the ball nut moves linearly up and down, and a bottom part that is coupled to the outer magnet top so that the outer magnet top rotates with the upper ball screw;
   wherein the gate assembly is contained within the valve body, and the inner magnetic cartridge assembly and valve body comprise a sealed lower section that is completely sealed to an outside environment;
   wherein the outer magnetic assembly is secured to the sealed lower section;
   wherein the magnet housing is fixedly attached to the top flange of the valve body;
   wherein an inner ball nut is locked rotationally to the inner magnet carrier; and
   wherein the inner ball nut is configured to cause the lower ball screw to move linearly up and down within the valve body as the inner ball nut rotates.

2. The rising stem valve of claim 1, wherein the inner magnets are situated within channels in the inner magnet carrier.

3. The rising stem valve of claim 1, wherein the inner magnetic cartridge assembly further comprises a spacer that abuts up against a bottom surface of the inner magnet carrier, and a spring ring that is situated on an upper surface of the spacer between the spacer and the inner magnet carrier.

4. The rising stem valve of claim 3, wherein a first upper tapered roller bearing is situated inside of the magnet housing directly underneath a ceiling of the magnet housing.

5. The rising stem valve of claim 4, wherein a first lower tapered roller bearing is situated inside of the magnet housing between the spacer and a compression nut.

6. The rising stem valve of claim 3, wherein the spacer is configured to rotate along with the inner ball nut and the inner magnet carrier.

7. The rising stem valve of claim 5, wherein the outer magnetic assembly further comprises a second upper tapered roller bearing and a second lower tapered roller bearing, the second upper tapered roller bearing being situated inside a bottom end of the outer magnet top and the second lower tapered roller bearing being held in a recess on an inside of the outer magnet carrier.

8. The rising stem valve of claim 7, wherein the second upper tapered roller bearing comprises an outer raceway that is constrained by the outer magnet top and an inner raceway that is constrained by the magnet housing, and the second lower tapered roller bearing comprises an outer raceway that is constrained by the outer magnet carrier and an inner raceway that is constrained by the magnet housing.

9. A rising stem valve comprising:
   (a) a manual actuator assembly comprised of a handle assembly and a manual actuator mount assembly;
   (b) a valve body comprised of a top flange;
   (c) a gate assembly with a lower ball screw, a gate mount and a gate, wherein a bottom end of the lower ball screw resides within the gate mount, and a lower portion of the gate mount is inserted into a guide channel in the gate;
   (d) an inner magnetic cartridge assembly comprised of a magnet housing and an inner magnetic cartridge, wherein the inner magnetic cartridge is comprised of an inner magnet carrier around which a plurality of inner magnets are arranged radially and spaced apart from one another, and wherein the inner magnetic cartridge resides within the magnet housing; and
   (e) an outer magnetic assembly comprised of an outer magnet carrier and an outer magnet top that is fixedly secured to the outer magnet carrier, a plurality of outer magnets held within the outer magnet carrier, the outer magnets being magnetically coupled to the inner magnets so that when the outer magnets rotate, the inner magnets rotate in a same direction;
   wherein the outer magnet top is configured to rotate as the handle assembly rotates;
   wherein the gate assembly is contained within the valve body, and the inner magnetic cartridge assembly and valve body comprise a sealed lower section that is completely sealed to an outside environment;
   wherein the outer magnetic assembly is secured to the sealed lower section;
   wherein the magnet housing is fixedly attached to the top flange of the valve body;
   wherein an inner ball nut is locked rotationally to the inner magnet carrier;
   wherein the inner ball nut is configured to cause the lower ball screw to move linearly up and down within the valve body as the inner ball nut rotates; and
   wherein the inner magnetic cartridge assembly further comprises a spacer that abuts up against a bottom surface of the inner magnet carrier, and a spring ring that is situated on an upper surface of the spacer between the spacer and the inner magnet carrier.

10. The rising stem valve of claim 9, wherein the inner magnets are situated within channels in the inner magnet carrier.

11. The rising stem valve of claim 9, wherein a first upper tapered roller bearing is situated inside of the magnet housing directly underneath a ceiling of the magnet housing.

12. The rising stem valve of claim 11, wherein a first lower tapered roller bearing is situated inside of the magnet housing between the spacer and a compression nut.

13. The rising stem valve of claim 9, wherein the spacer is configured to rotate along with the inner ball nut and the inner magnet carrier.

14. The rising stem valve of claim 12, wherein the outer magnetic assembly further comprises a second upper tapered roller bearing and a second lower tapered roller bearing, the second upper tapered roller bearing being situated inside a bottom end of the outer magnet top and the second lower tapered roller bearing being held in a recess on an inside of the outer magnet carrier.

15. The rising stem valve of claim 14, wherein the second upper tapered roller bearing comprises an outer raceway that is constrained by the outer magnet top and an inner raceway that is constrained by the magnet housing, and the second lower tapered roller bearing comprises an outer raceway that is constrained by the outer magnet carrier and an inner raceway that is constrained by the magnet housing.

16. The rising stem valve of claim 14, wherein the handle assembly comprises a handle and a key, wherein the key fits into a first keyway in a center hole of the handle and a second keyway in the outer magnet top.

* * * * *